United States Patent
Someya et al.

(10) Patent No.: US 10,479,879 B2
(45) Date of Patent: Nov. 19, 2019

(54) CURABLE COMPOSITION, CURED PRODUCT OF THE CURABLE COMPOSITION, AND METHOD OF PRODUCING A CURED PRODUCT USING THE CURABLE COMPOSITION

(71) Applicant: TOKYO OHKA KOGYO CO., LTD., Kawasaki-shi (JP)

(72) Inventors: Kazuya Someya, Kawasaki (JP); Hiroki Chisaka, Kawasaki (JP); Naozumi Matsumoto, Kawasaki (JP); Dai Shiota, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 48 days.

(21) Appl. No.: 15/904,857

(22) Filed: Feb. 26, 2018

(65) Prior Publication Data

US 2018/0251626 A1    Sep. 6, 2018

(30) Foreign Application Priority Data

Mar. 2, 2017  (JP) ................ 2017-039884

(51) Int. Cl.
| | |
|---|---|
| *C08K 5/372* | (2006.01) |
| *C08L 29/10* | (2006.01) |
| *C08K 5/55* | (2006.01) |
| *C08J 3/28* | (2006.01) |

(52) U.S. Cl.
CPC ................ *C08K 5/372* (2013.01); *C08J 3/28* (2013.01); *C08K 5/55* (2013.01); *C08L 29/10* (2013.01)

(58) Field of Classification Search
CPC .... C08K 5/372; C08K 5/55; C08J 3/24; C08J 3/243; C08J 3/28; C08L 29/10
USPC ........................................................ 524/302
See application file for complete search history.

(56) References Cited

U.S. PATENT DOCUMENTS

2010/0026771 A1* 2/2010 Mochizuki ............. B41J 11/002
                                                            347/102

FOREIGN PATENT DOCUMENTS

JP         2010-030223  A       2/2010

* cited by examiner

*Primary Examiner* — William K Cheung
(74) *Attorney, Agent, or Firm* — Knobbe, Martens, Olson & Bear LLP

(57) ABSTRACT

A cationically polymerizable curable composition comprising a compound having a vinyloxy group bonded to an aromatic group which is easily cured upon light exposure and/or heating, a cured product of the curable composition, and a method of producing a cured product using the curable composition. In a cationically polymerizable curable composition that includes a compound having a vinyloxy group bonded to an aromatic group, a sulfonium salt having a specific structure is used as a curing agent. A cured product is produced by shaping the curable composition into a predetermined shape, and subjecting the shaped curable composition to light exposure and/or heating.

12 Claims, No Drawings

CURABLE COMPOSITION, CURED PRODUCT OF THE CURABLE COMPOSITION, AND METHOD OF PRODUCING A CURED PRODUCT USING THE CURABLE COMPOSITION

This application claims benefit priority to Japanese Patent Application No. 2017-039884, filed Mar. 2, 2017, the entire content of which is incorporated herein by reference.

BACKGROUND OF THE INVENTION

Field of the Invention

The present invention relates to a curable composition, a cured product of the curable composition, and a method of producing a cured product using the curable composition.

Related Art

Conventionally, cationically polymerizable curable compositions containing a vinyl ether compound as a curable component have been used in various applications. As such curable compositions, an ink composition that is curable upon ultraviolet irradiation and contains a vinyl ether compound, an oxirane compound and/or an oxetane compound, a photo-cationic-polymerization initiator, and a coloring agent is proposed, for example (see Patent Document 1). Patent Document 1 discloses the effectiveness of using a vinyl ether compound (such as vinyloxybenzene or hydroquinone divinyl ether) that has an aromatic group substituted with a vinyloxy group in the formation of a cured product with excellent hardness (see paragraph [0123], for example).

Patent Document 1: Japanese Unexamined Patent Application, Publication No. 2010-30223

SUMMARY OF THE INVENTION

However, depending on the composition of the cationically polymerizable curable composition that contains a vinyl ether compound containing an aromatic group substituted with a vinyloxy group, the cationically polymerizable curable composition may not be favorably cured upon light exposure and/or heating.

The present invention has an object to provide a cationically polymerizable curable composition that includes a compound having a vinyloxy group bonded to an aromatic group and that is easily cured upon at least one of light exposure and heating, a cured product of the curable composition, and a method of producing a cured product using the curable composition.

The inventors of the present invention have found that it is possible to attain the object described above by using a sulfonium salt having a specific structure as a curing agent for a cationically polymerizable curable composition that has a vinyloxy group bonded to an aromatic group. Thus, the present invention has now been completed. More specifically, the present invention provides the followings.

A first aspect of the present invention provides a curable composition comprising a cationic polymerization initiator (A) and an aromatic vinyl ether compound (B), in which the aromatic vinyl ether compound (B) contains an aromatic group substituted with a vinyloxy group, and the cationic polymerization initiator (A) contains a sulfonium salt represented by the following formula (a1):

[Formula 1]

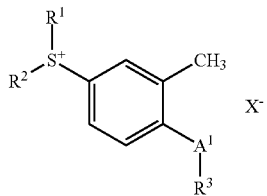

(a1)

(in the formula (a1), $R^1$ and $R^2$ independently represent a group represented by the following formula (a2); $R^1$ and $R^2$ may be bonded to each other to form a ring together with the sulfur atom in the formula; $R^3$ represents a group represented by the following formula (a3) or a group represented by the following formula (a4); $A^1$ represents S, O, or Se; $X^-$ represents a monovalent anion; and not both of $R^1$ and $R^2$ represent an alkyl group optionally substituted with a halogen atom).

[Formula 2]

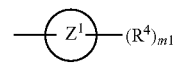

(a2)

(in the formula (a2), a ring $Z^1$ represents an aromatic hydrocarbon ring; $R^4$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic hydrocarbon group, an alkylsulfinyl group, an alkylsulfonyl group, a hydroxy(poly)alkyleneoxy group, an optionally substituted amino group, a cyano group, a nitro group, or a halogen atom; and m1 represents an integer of 0 or more)

[Formula 3]

(a3)

(in the formula (a3), $R^5$ represents an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a5); $R^6$ represents an alkyl group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)

alkyleneoxy group, an optionally substituted amino group, a cyano group, a nitro group, or a halogen atom or a group represented by the following formula (a6); $A^2$ represents a single bond, S, O, a sulfinyl group, or a carbonyl group; and n1 represents 0 or 1)

[Formula 4]

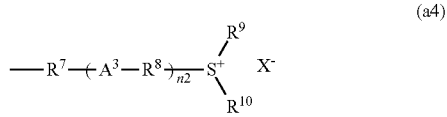

(in the formula (a4), $R^7$ and $R^8$ independently represent an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a5); $R^9$ and $R^{10}$ independently represent an alkyl group optionally substituted with a halogen atom or a group represented by the formula (a2); $R^9$ and $R^{10}$ may be bonded to each other to form a ring together with the sulfur atom in the formula; $A^3$ represents a single bond, S, O, a sulfinyl group, or a carbonyl group; $X^-$ is the same as defined above; n2 represents 0 or 1; and not both of $R^9$ and $R^{10}$ are an alkyl group optionally substituted with a halogen atom)

[Formula 5]

(in formula (a5), a ring $Z^2$ represents an aromatic hydrocarbon ring; $R^{11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom; and m2 represents an integer of 0 or more)

[Formula 6]

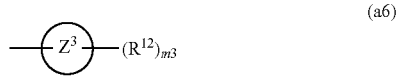

(in formula (a6), a ring $Z^3$ represents an aromatic hydrocarbon ring; $R^{12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, a selenophenylcarbonyl group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom; and m3 represents an integer of 0 or more).

A second aspect of the present invention provides a cured product formed by curing the curable composition as described in the first aspect.

A third aspect of the present invention provides a method of producing a cured product, in which the method comprises: shaping the curable composition as described in the first aspect into a predetermined shape; and subjecting the curable composition thus shaped to at least one of light exposure and heating.

According to the present invention, it is possible to provide a cationically polymerizable curable composition that comprises a compound having a vinyloxy group bonded to an aromatic group and that is easily cured upon at least one of light exposure and heating, a cured product of the curable composition, and a method of producing a cured product using the curable composition.

DETAILED DESCRIPTION OF THE INVENTION

<<Curable Composition>>

A curable composition comprises a cationic polymerization initiator (A) and an aromatic vinyl ether compound (B). The cationic polymerization initiator (A) comprises a sulfonium salt having a specific structure described below. The aromatic vinyl ether compound (B) comprises an aromatic group substituted with a vinyloxy group. When the aromatic vinyl ether compound (B) is used, a cured product with excellent hardness and excellent mechanical properties is likely to be formed; on the other hand, since the aromatic vinyl ether compound (B) including an aromatic group substituted with a vinyloxy group is used as a curable component, a cured product may not be favorably cured upon heating and/or light exposure. When the aromatic vinyl ether compound (B) is cured by using the cationic polymerization initiator (A) containing a sulfonium salt having a specific structure described below, the curing is likely to favorably proceed.

Next, essential or optional components of the curable composition are described below one after another.

<Cationic Polymerization Initiator (A)>

The curable composition comprises the cationic polymerization initiator (A) for polymerizing the vinyl ether compound (B) described below. The cationic polymerization initiator contains a sulfonium salt represented by the following formula (a1) (hereinafter, the sulfonium salt is called "sulfonium salt (Q)"). When the curable composition comprises the sulfonium salt (Q) as the cationic polymerization initiator (A), the curing of the aromatic vinyloxy compound (B) described below is likely to favorably proceed.

[Formula 7]

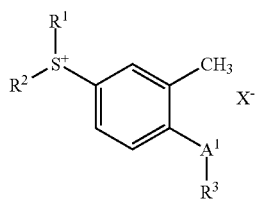

(a1)

(In the formula (a1), $R^1$ and $R^2$ independently represent a group represented by the following formula (a2); $R^1$ and $R^2$ may be bonded to each other to form a ring together with the sulfur atom in the formula; $R^3$ represents a group represented by the following formula (a3) or a group represented by the following formula (a4); $A^1$ represents S, O, or Se; $X^-$ represents a monovalent anion; and not both of $R^1$ and $R^2$ represent an alkyl group optionally substituted with a halogen atom.)

[Formula 8]

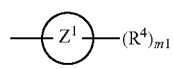

(a2)

(In the formula (a2), a ring $Z^1$ represents an aromatic hydrocarbon ring; $R^4$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic hydrocarbon group, an alkylsulfinyl group, an alkylsulfonyl group, a hydroxy(poly)alkyleneoxy group, an optionally substituted amino group, a cyano group, a nitro group, or a halogen atom; and m1 represents an integer of 0 or more.)

[Formula 9]

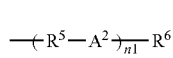

(a3)

(In the formula (a3), $R^5$ represents an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a5); $R^6$ represents an alkyl group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a6); $A^2$ represents a single bond, S, O, a sulfinyl group, or a carbonyl group; and n1 represents 0 or 1.)

[Formula 10]

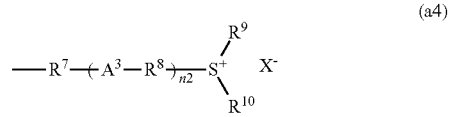

(a4)

(In the formula (a4), $R^7$ and $R^8$ independently represent an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a5); $R^9$ and $R^{10}$ independently represent an alkyl group optionally substituted with a halogen atom or a group represented by the formula (a2); $R^9$ and $R^{10}$ may be bonded to each other to form a ring together with the sulfur atom in the formula; $A^3$ represents a single bond, S, O, a sulfinyl group, or a carbonyl group; $X^-$ is the same as defined above; n2 represents 0 or 1; and not both of $R^9$ and $R^{10}$ are an alkyl group optionally substituted with a halogen atom.)

[Formula 11]

(a5)

(In the formula (a5), a ring $Z^2$ represents an aromatic hydrocarbon ring; $R^{11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom; and m2 represents an integer of 0 or more.)

[Formula 12]

(a6)

(In the formula (a6), a ring $Z^3$ represents an aromatic hydrocarbon ring; $R^{12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, a selenophenylcarbonyl group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom; and m3 represents an integer of 0 or more.)

(Sulfonium Salt (Q))

Next, the sulfonium salt (Q) is described. The sulfonium salt (Q) is characterized as follows: the benzene ring in the formula (a1) has a methyl group bonded to the carbon atom at the ortho position relative to the carbon atom to which A' is bonded. Having a methyl group at this position, the sulfonium salt (Q) tends to release a proton and is highly sensitive to an active energy ray such as an ultraviolet ray compared to a conventional sulfonium salt.

In the formula (a1), each of $R^1$ and $R^2$ is preferably a group represented by the formula (a2). $R^1$ and $R^2$ may be the same as or different from each other. In the formula (a1), when $R^1$ and $R^2$ are bonded to each other to form a ring together with the sulfur atom in the formula, the ring thus formed is preferably a ring consisting of 3 to 10 members, more preferably a ring consisting of 5 to 7 members, with the sulfur atom counted in. The ring thus formed may be a polycyclic ring. The polycyclic ring is preferably a condensed ring consisting of 5 to 7 members. In the formula (a1), each of $R^1$ and $R^2$ is preferably a phenyl group. In the formula (a1), $R^3$ is preferably a group represented by the formula (a3). In the formula (a1), $A^1$ is preferably S or O, more preferably S.

In the formula (a2), $R^4$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group, or a nitro group, more preferably an alkyl group optionally substituted with a halogen atom, an alkylcarbonyl group, or a thienylcarbonyl group. In the formula (a2), m1 can be selected depending on the type of the ring $Z^1$. m1 may be, for example, an integer of 0 or more and 4 or less, preferably an integer of 0 or more and 3 or less, and more preferably an integer of 0 or more and 2 or less.

In the formula (a3), $R^5$ is preferably an alkylene group; an alkylene group substituted with a hydroxy group, an optionally substituted amino group, or a nitro group; or a group represented by the formula (a5); more preferably a group represented by the formula (a5). In the formula (a3), $R^6$ is preferably an alkyl group; an alkyl group substituted with a hydroxy group, an optionally substituted amino group, or a nitro group; or a group represented by the formula (a6); more preferably a group represented by the formula (a6). In the formula (a3), $A^2$ is preferably S or O, more preferably S. In the formula (a3), n1 is preferably 0.

In the formula (a4), it is preferable that $R^7$ and $R^8$ independently represent an alkylene group; an alkylene group substituted with a hydroxy group, an optionally substituted amino group, or a nitro group; or a group represented by the formula (a5); more preferably a group represented by the formula (a5). $R^7$ and $R^8$ may be the same as or different from each other. In the formula (a4), each of $R^9$ and $R^{10}$ is preferably a group represented by the formula (a2). $R^9$ and $R^{10}$ may be the same as or different from each other. In the formula (a4), when $R^9$ and $R^{10}$ are bonded to each other to form a ring together with the sulfur atom in the formula, the ring thus formed is preferably a ring consisting of 3 to 10 members, more preferably a ring consisting of 5 to 7 members, with the sulfur atom counted in. The ring thus formed may be a polycyclic ring, preferably a condensation product of rings each consisting of 5 to 7 members. In the formula (a4), $A^3$ is preferably S or O, more preferably S. In the formula (a4), n2 is preferably 0.

In the formula (a5), $R^{11}$ is preferably an alkyl group optionally substituted with a halogen atom, a hydroxy group, an optionally substituted amino group, or a nitro group, more preferably an alkyl group optionally substituted with a halogen atom. In the formula (a5), m2 can be selected depending on the type of the ring $Z^2$, and may be, for example, an integer of 0 or more and 4 or less, preferably an integer of 0 or more and 3 or less, and more preferably an integer of 0 or more and 2 or less.

In the formula (a6), $R^{12}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group, or a nitro group, more preferably an alkyl group optionally substituted with a halogen atom, an alkylcarbonyl group, or a thienylcarbonyl group. In the formula (a6), m3 may be selected depending on the type of the ring $Z^3$ and may be, for example, an integer of 0 or more and 4 or less, preferably an integer of 0 or more and 3 or less, and more preferably an integer of 0 or more and 2 or less.

In the formula (a1), $X^-$ is a monovalent anion corresponding to an acid (HX) that is generated upon irradiation of the sulfonium salt (Q) with active energy (such as heat, visible light, ultraviolet light, an electron beam, and/or an X-ray). When the sulfonium salt (Q) is used as an acid generator, preferable examples of $X^-$ include monovalent polyatomic anions, more preferably anions represented by $MY_a^-$, $(Rf)_bPF_{6-b}^-$, $R^{x1}_cBY_{4-c}^-$, $R^{x1}_cGaY_{4-c}^-$, $R^{x2}SO_3^-$, $(R^{x2}SO_2)_3C^-$, and $(R^{x2}SO_2)_2N^-$. Alternatively, $X^-$ may be a halide anion and examples thereof include fluoride ion, chloride ion, bromide ion, and iodide ion.

M represents a phosphorus atom, a boron atom, or an antimony atom. Y represents a halogen atom (preferably a fluorine atom).

Rf represents an alkyl group (an alkyl group having 1 or more and 8 or less carbon atoms is preferable) in which 80 mol % or higher of the hydrogen atoms are substituted with fluorine atoms. Examples of the fluorine-substituted alkyl group as Rf include straight chain alkyl groups (such as methyl group, ethyl group, propyl group, butyl group, pentyl group, and octyl group), branched chain alkyl groups (such as isopropyl group, isobutyl group, sec-butyl group, and tert-butyl group), and cycloalkyl groups (such as cyclopropyl group, cyclobutyl group, cyclopentyl group, and cyclohexyl group). The proportion of the hydrogen atoms in the alkyl group as Rf substituted with fluorine atoms is preferably 80 mol % or higher, further preferably 90% or higher, particularly preferably 100% based on the number of moles of hydrogen atoms contained in the alkyl group before substitution. When the proportion of substitution with fluorine atoms is within this preferable range, the sulfonium salt (Q) has a further excellent light sensitivity. Particularly preferable examples of Rf include $CF_3^-$, $CF_3CF_2^-$, $(CF_3)_2CF^-$, $CF_3CF_2CF_2^-$, $CF_3CF_2CF_2CF_2^-$, $(CF_3)_2CFCF_2^-$, $CF_3CF_2 \ (CF_3)CF^-$, and $(CF_3)_3C^-$. b Rfs (b indicates the number of Rfs) are independent of each other and may be the same as or different from each other.

P represents a phosphorus atom, and F represents a fluorine atom.

$R^{x1}$ represents a phenyl group in which a part of the hydrogen atoms are each substituted with at least one element or at least one electron-withdrawing group. Examples of the at least one element include halogen atoms, such as fluorine atom, chlorine atom, and bromine atom. Examples of the electron-withdrawing group include trifluoromethyl group, nitro group, and cyano group. Among these, a phenyl group in which at least one hydrogen atom is substituted with a fluorine atom or a trifluoromethyl group is preferable. c $R^{x1}$s (c indicates the number of $R^{x1}$s) are independent of each other and may be the same as or different from each other.

B represents a boron atom, and Ga represents a gallium atom.

$R^{x2}$ represents an alkyl group having 1 or more and 20 or less carbon atoms, a fluoroalkyl group having 1 or more and 20 or less carbon atoms, or an aryl group having 6 or more and 20 or less carbon atoms; the alkyl group and the fluoroalkyl group may have any of a straight-chain structure, a branched-chain structure, and a cyclic structure; and the alkyl group, the fluoroalkyl group, or the aryl group may have no substituent or may have a substituent. Examples of the substituent include hydroxy group, optionally substituted amino groups (for example, those mentioned in the description regarding the formulae (a2) to (a6) below), and nitro group. The carbon chain of the alkyl group, the fluoroalkyl group, or the aryl group represented by $R^{x2}$ may have a heteroatom such as an oxygen atom, a nitrogen atom, or a sulfur atom. In particular, the carbon chain of the alkyl group or the fluoroalkyl group represented by $R^{x2}$ may have a divalent functional group (such as an ether bond, a carbonyl bond, an ester bond, an amino bond, an amide bond, an imide bond, a sulfonyl bond, a sulfonylamide bond, a sulfonylimide bond, or a urethane bond). When the alkyl group, the fluoroalkyl group, or the aryl group represented by $R^{x2}$ has the substituent, the heteroatom, or the functional group described above, the number of the substituent, the heteroatom, or the functional group may be one, two, or more.

S represents a sulfur atom. O represents an oxygen atom. C represents a carbon atom. N represents a nitrogen atom. a represents an integer of 4 or more and 6 or less. b is preferably an integer of 1 or more and 5 or less, further preferably an integer of 2 or more and 4 or less, and particularly preferably 2 or 3. c is preferably an integer of 1 or more and 4 or less, and further preferably 4.

Examples of the anion represented by $MY_a^-$ include anions represented by $SbF_6^-$, $PF_6^-$, and $BF_4^-$.

Examples of the anion represented by $(Rf)_b PF_{6-b}^-$ include anions represented by $(CF_3CF_2)_2PF_4^-$, $(CF_3CF_2)_3PF_3^-$, $((CF_3)_2CF)_2PF_4^-$, $((CF_3)_2CF)_3PF_3^-$, $(CF_3CF_2CF_2)_2PF_4^-$, $(CF_3CF_2CF_2)_3PF_3^-$, $(CF_3)_2CFCF_2)_2PF_4^-$, $((CF_3)_2CFCF_2)_3PF_3^-$, $(CF_3CF_2CF_2CF_2)_2PF_4^-$, and $(CF_3CF_2CF_2CF_2)_3PF_3^-$. Among these, anions represented by $(CF_3CF_2)_3PF_3^-$, $(CF_3CF_2CF_2)_3PF_3^-$, $((CF_3)_2CF)_3PF_3^-$, $((CF_3)_2CF)_2PF_4^-$, $(CF_3)_2CFCF_2)_3PF_3^-$, and $((CF_3)_2CFCF_2)_2PF_4^-$ are preferable.

The anion represented by $R^{x1}_c BY_{4-c}^-$ is preferably:

$$R^{x1}_c BY_{4-c}^-$$

(wherein $R^{x1}$ represents a phenyl group formed by substituting at least a part of hydrogen atoms with a halogen atom or an electron-withdrawing group, Y represents a halogen atom, and c represents an integer of 1 or more and 4 or less) and examples thereof include anions represented by $(C_6F_5)_4B^-$, $((CF_3)_2C_6H_3)_4B^-$, $(CF_3C_6H_4)_4B^-$, $(C_6F_5)_2BF_2^-$, $C_6F_5BF_3^-$, and $(C_6H_3F_2)_4B^-$. Among these, anions represented by $(C_6F_5)_4B^-$ and $((CF_3)_2C_6H_3)_4B^-$ are preferable.

Examples of the anion represented by $R^{x1}_c GaY_{4-c}^-$ include anions represented by $(C_6F_5)_4Ga^-$, $((CF_3)_2C_6H_3)_4Ga^-$, $(CF_3C_6H_4)_4Ga^-$, $(C_6F_5)_2GaF_2^-$, $C_6F_5GaF_3^-$, and $(C_6H_3F_2)_4Ga^-$. Among these, anions represented by $(C_6F_5)_4Ga^-$ and $((CF_3)_2C_6H_3)_4Ga^-$ are preferable.

Examples of the anion represented by $R^{x2}SO_3^-$ include trifluoromethanesulfonate anion, pentafluoroethanesulfonate anion, heptafluoropropanesulfonate anion, nonafluorobutanesulfonate anion, pentafluorophenylsulfonate anion, p-toluenesulfonate anion, benzenesulfonate anion, camphor sulfonate anion, methanesulfonate anion, ethanesulfonate anion, propanesulfonate anion, and butanesulfonate anion. Among these, trifluoromethanesulfonate anion, nonafluorobutanesulfonate anion, methanesulfonate anion, butanesulfonate anion, camphor sulfonate anion, benzenesulfonate anion, and p-toluenesulfonate anion are preferable.

Examples of the anion represented by $(R^{x2}SO_2)_3C^-$ include anions represented by $(CF_3SO_2)_3C^-$, $(C_2F_5SO_2)_3C^-$, $(C_3F_7SO_2)_3C^-$, and $(C_4F_9SO_2)_3C^-$.

Examples of the anion represented by $(R^{x2}SO_2)_2N^-$ include anions represented by $(CF_3SO_2)_2N^-$, $(C_2F_5SO_2)_2N^-$, $(C_3F_7SO_2)_2N^-$, and $(C_4F_9SO_2)_2N^-$.

Examples of the monovalent polyatomic anions that are usable include anions represented by $MY_a^-$, $(Rf)_b PF_{6-b}^-$, $R^{x1}_c BY_{4-c}^-$, $R^{x1}_c GaY_{4-c}^-$, $R^{x2}SO_3^-$, $(R^{x2}SO_2)_3C^-$, and $(R^{x2}SO_2)_2N^-$, as well as perhalide ions (such as $ClO_4^-$ and $BrO_4^-$), sulfonic acid halide ions (such as $FSO_3^-$ and $ClSO_3^-$), sulfate ions (such as $CH_3SO_4^-$, $CF_3SO_4^-$, and $HSO_4^-$), carbonate ions (such as $HCO_3^-$ and $CH_3CO_3^-$) aluminate ions (such as $AlCl_4^-$ and $AlF_4^-$), hexafluoro bismuthate ion ($BiF_6^-$), carboxylate ions (such as $CH_3COO^-$, $CF_3COO^-$, $C_6H_5COO^-$, $CH_3C_6H_4COO^-$, $C_6F_5COO^-$, and $CF_3C_6H_4COO^-$), aryl borate ions (such as $B(C_6H_5)_4^-$ and $CH_3CH_2CH_2CH_2B(C_6H_5)_3^-$), thiocyanate ion ($SCN^-$), and nitrate ion ($NO_3^-$).

Among these examples of $X^-$, in terms of cationic polymerizability, anions represented by $MY_a^-$, $(Rf)_b PF_{6-b}^-$, $R^{x1}_c BY_{4-c}^-$, $R^{x1}_c GaY_{4-c}^-$, and $(R^{x2}SO_2)_3C^-$ are preferable, $SbF_6^-$, $PF_6^-$, $(CF_3CF_2)_3PF_3^-$, $(C_6F_5)_4B^-$, $((CF_3)_2C_6H_3)_4B^-$, $(C_6F_5)_4Ga^-$, $((CF_3)_2C_6H_3)_4Ga^-$, and $(CF_3SO_2)_3C^-$ are more preferable, and $R^{x1}_c BY_{4-c}^-$ is further preferable.

Examples of the aromatic hydrocarbon ring in each of the formulae (a2), (a5), and (a6) include benzene ring and condensed polycyclic aromatic hydrocarbon rings [condensed di- to tetracyclic aromatic hydrocarbon rings, such as condensed dicyclic hydrocarbon rings (such as $C_{8-20}$ condensed dicyclic hydrocarbon rings (such as naphthalene ring), preferably $C_{10-16}$ condensed dicyclic hydrocarbon rings) and condensed tricyclic aromatic hydrocarbon rings (such as anthracene ring and phenanthrene ring)]. Each of the aromatic hydrocarbon rings is preferably a benzene ring or a naphthalene ring, more preferably a benzene ring.

Examples of the halogen atom in each of the formulae (a1) to (a6) include fluorine atom, chlorine atom, bromine atom, and iodine atom.

Examples of the alkyl group in each of the formulae (a1) to (a6) include straight chain alkyl groups having 1 or more and 18 or less carbon atoms (such as methyl group, ethyl group, n-propyl group, n-butyl group, n-pentyl group, n-octyl group, n-decyl group, n-dodecyl group, n-tetradecyl group, n-hexadecyl group, and n-octadecyl group), branched chain alkyl groups having 3 or more and 18 or less carbon atoms (such as isopropyl group, isobutyl group, sec-butyl group, tert-butyl group, isopentyl group, neopentyl group, tert-pentyl group, isohexyl group, and isooctadecyl group), and cycloalkyl groups having 3 or more and 18 or less carbon atoms (such as cyclopropyl group, cyclobutyl group, cyclopentyl group, cyclohexyl group, and 4-decylcyclohexyl group). In particular, the alkyl group optionally substituted with a halogen atom in each of the formulae (a1), (a2), and (a4) to (a6) refers to either an alkyl group or an alkyl group substituted with a halogen atom. Examples of the alkyl group substituted with a halogen atom include groups equivalent to the straight chain alkyl groups, the branched chain alkyl groups, and the cycloalkyl groups described above in which at least one hydrogen atom is substituted with a halogen atom (such as monofluoromethyl group, difluoromethyl group, and trifluoromethyl group). $R^1$, $R^2$, $R^9$, or $R^{10}$ is particularly preferably a trifluoromethyl group and $R^4$, $R^6$, $R^{11}$, or $R^{12}$ is particularly preferably a methyl group among these alkyl groups optionally substituted with a halogen atom.

Examples of the alkoxy group in each of the formulae (a2) to (a6) include straight chain or branched chain alkoxy groups having 1 or more and 18 or less carbon atoms (such as methoxy group, ethoxy group, propoxy group, isopropoxy group, butoxy group, isobutoxy group, sec-butoxy group, tert-butoxy group, hexyloxy group, decyloxy group, dodecyloxy group, and octadecyloxy group).

Examples of the alkyl group in the alkylcarbonyl group in each of the formulae (a2) to (a6) include the straight chain alkyl groups having 1 or more and 18 or less carbon atoms, the branched chain alkyl groups having 3 or more and 18 or less carbon atoms, or the cycloalkyl groups having 3 or more and 18 or less carbon atoms described above. Examples of the alkylcarbonyl group in the same formulae include straight chain, branched chain, or cyclic $C_{2-18}$ alkylcarbonyl groups (such as acetyl group, propionyl group, butanoyl group, 2-methylpropionyl group, heptanoyl group, 2-methylbutanoyl group, 3-methylbutanoyl group, octanoyl group, decanoyl group, dodecanoyl group, octadecanoyl group, cyclopentanoyl group, and cyclohexanoyl group).

Examples of the arylcarbonyl group in each of the formulae (a3) to (a6) include arylcarbonyl groups having 7 or more and 11 or less carbon atoms (such as benzoyl group and naphthoyl group).

Examples of the alkoxycarbonyl group in each of the formulae (a2) to (a6) include straight chain or branched chain alkoxycarbonyl groups having 2 or more and 19 or less carbon atoms (such as methoxycarbonyl group, ethoxycarbonyl group, propoxycarbonyl group, isopropoxycarbonyl group, butoxycarbonyl group, isobutoxycarbonyl group, sec-butoxycarbonyl group, tert-butoxycarbonyl group, octyloxycarbonyl group, tetradecyloxycarbonyl group, and octadecyloxycarbonyl group).

Examples of the aryloxycarbonyl group in each of the formulae (a3) to (a6) include aryloxycarbonyl groups having 7 or more and 11 or less carbon atoms (such as phenoxycarbonyl group and naphthoxycarbonyl group).

Examples of the arylthiocarbonyl group in each of the formulae (a3) to (a6) include arylthiocarbonyl groups having 7 or more and 11 or less carbon atoms (such as phenylthiocarbonyl group and naphthoxythiocarbonyl group).

Examples of the acyloxy group in each of the formulae (a2) to (a6) include straight chain or branched chain acyloxy groups having 2 or more and 19 or less carbon atoms (such as acetoxy group, ethylcarbonyloxy group, propylcarbonyloxy group, isopropylcarbonyloxy group, butylcarbonyloxy group, isobutylcarbonyloxy group, sec-butylcarbonyloxy group, tert-butylcarbonyloxy group, octylcarbonyloxy group, tetradecylcarbonyloxy group, and octadecylcarbonyloxy group).

Examples of the arylthio group in each of the formulae (a3) to (a6) include arylthio groups having 6 or more and 20 or less carbon atoms (such as phenylthio group, 2-methylphenylthio group, 3-methylphenylthio group, 4-methylphenylthio group, 2-chlorophenylthio group, 3-chlorophenylthio group, 4-chlorophenylthio group, 2-bromophenylthio group, 3-bromophenylthio group, 4-bromophenylthio group, 2-fluorophenylthio group, 3-fluorophenylthio group, 4-fluorophenylthio group, 2-hydroxyphenylthio group, 4-hydroxyphenylthio group, 2-methoxyphenylthio group, 4-methoxyphenylthio group, 1-naphthylthio group, 2-naphthylthio group, 4-[4-(phenylthio)benzoyl]phenylthio group, 4-[4-(phenylthio)phenoxy]phenylthio group, 4-[4-(phenylthio)phenyl]phenylthio group, 4-(phenylthio)phenylthio group, 4-benzoylphenylthio group, 4-benzoyl-2-chlorophenylthio group, 4-benzoyl-3-chlorophenylthio group, 4-benzoyl-3-methylthiophenylthio group, 4-benzoyl-2-methylthiophenylthio group, 4-(4-methylthiobenzoyl)phenylthio group, 4-(2-methylthiobenzoyl)phenylthio group, 4-(p-methylbenzoyl)phenylthio group, 4-(p-ethylbenzoyl)phenylthio group, 4-(p-isopropylbenzoyl)phenylthio group, and 4-(p-tert-butylbenzoyl)phenylthio group).

Examples of the alkylthio group in each of the formulae (a2) to (a6) include straight chain or branched chain alkylthio groups having 1 or more and 18 or less carbon atoms (such as methylthio group, ethylthio group, propylthio group, isopropylthio group, butylthio group, isobutylthio group, sec-butylthio group, tert-butylthio group, pentylthio group, isopentylthio group, neopentylthio group, tert-pentylthio group, octylthio group, decylthio group, dodecylthio group, and isooctadecylthio group).

Examples of the aryl group in each of the formulae (a3) to (a6) include aryl groups having 6 or more and 10 or less carbon atoms (such as phenyl group, tolyl group, dimethylphenyl group, and naphthyl group).

Examples of the heterocyclic aliphatic hydrocarbon group in the formula (a2) include heterocyclic hydrocarbon groups having 2 or more and 20 or less (preferably 4 or more and 20 or less) carbon atoms (such as pyrrolidinyl group, tetrahydrofuranyl group, tetrahydrothienyl group, piperidinyl group, tetrahydropyranyl group, tetrahydrothiopyranyl group, and morpholinyl group).

Examples of the heterocyclic hydrocarbon group in each of the formulae (a3) to (a6) include heterocyclic hydrocarbon groups having 4 or more and 20 or less carbon atoms (such as thienyl group, furanyl group, selenophenyl group, pyranyl group, pyrrolyl group, oxazolyl group, thiazolyl group, pyridyl group, pyrimidyl group, pyrazinyl group, indolyl group, benzofuranyl group, benzothienyl group, quinolyl group, isoquinolyl group, quinoxalinyl group, quinazolinyl group, carbazolyl group, acridinyl group, phenothiazinyl group, phenazinyl group, xanthenyl group, thianthrenyl group, phenoxazinyl group, phenoxathiinyl group, chromanyl group, isochromanyl group, dibenzothienyl group, xanthonyl group, thioxanthonyl group, and dibenzofuranyl group).

Examples of the aryloxy group in each of the formulae (a3) to (a6) include aryloxy groups having 6 or more and 10 or less carbon atoms (such as phenoxy group and naphthyloxy group).

Examples of the alkylsulfinyl group in each of the formulae (a2) to (a6) include straight chain or branched chain sulfinyl groups having 1 or more and 18 or less carbon atoms (such as methylsulfinyl group, ethylsulfinyl group, propyl-sulfinyl group, isopropylsulfinyl group, butylsulfinyl group, isobutylsulfinyl group, sec-butylsulfinyl group, tert-butylsulfinyl group, pentylsulfinyl group, isopentylsulfinyl group, neopentylsulfinyl group, tert-pentylsulfinyl group, octylsulfinyl group, and isooctadecylsulfinyl group).

Examples of the arylsulfinyl group in each of the formulae (a3) to (a6) include arylsulfinyl groups having 6 or more and 10 or less carbon atoms (such as phenylsulfinyl group, tolylsulfinyl group, and naphthylsulfinyl group).

Examples of the alkylsulfonyl group in each of the formulae (a2) to (a6) include straight chain or branched chain alkylsulfonyl groups having 1 or more and 18 or less carbon atoms (such as methylsulfonyl group, ethylsulfonyl group, propylsulfonyl group, isopropylsulfonyl group, butylsulfonyl group, isobutylsulfonyl group, sec-butylsulfonyl group, tert-butylsulfonyl group, pentylsulfonyl group, isopentylsulfonyl group, neopentylsulfonyl group, tert-pentylsulfonyl group, octylsulfonyl group, and octadecylsulfonyl group).

Examples of the arylsulfonyl group in each of the formulae (a3) to (a6) include arylsulfonyl groups having 6 or more and 10 or less carbon atoms (such as phenylsulfonyl group, tolylsulfonyl group (tosyl group), and naphthylsulfonyl group).

Examples of the hydroxy(poly)alkyleneoxy group in each of the formulae (a2) to (a6) include hydroxy(poly)alkyleneoxy groups represented by HO(AO)$_q$— (wherein each AO independently represents an ethyleneoxy group and/or a propyleneoxy group and q represents an integer of 1 or more and 5 or less).

Examples of the optionally substituted amino group in each of the formulae (a2) to (a6) include amino group (—NH$_2$) and substituted amino groups having 1 or more and 15 or less carbon atoms (such as methylamino group, dimethylamino group, ethylamino group, methylethylamino group, diethylamino group, n-propylamino group, methyl-n-propylamino group, ethyl-n-propylamino group, n-propylamino group, isopropylamino group, isopropylmethylamino group, isopropylethylamino group, diisopropylamino group, phenylamino group, diphenylamino group, methylphenylamino group, ethylphenylamino group, n-propylphenylamino group, and isopropylphenylamino group).

Examples of the alkylene group in each of the formulae (a3) and (a4) include straight chain or branched chain alkylene groups having 1 or more and 18 or less carbon atoms (such as methylene group, 1,2-ethylene group, 1,1-ethylene group, propane-1,3-diyl group, propane-1,2-diyl group, propane-1,1-diyl group, propane-2,2-diyl group, butane-1,4-diyl group, butane-1,3-diyl group, butane-1,2-diyl group, butane-1,1-diyl group, butane-2,2-diyl group, butane-2,3-diyl group, pentane-1,5-diyl group, pentane-1,4-diyl group, hexane-1,6-diyl group, heptane-1,7-diyl group, octane-1,8-diyl group, 2-ethylhexane-1,6-diyl group, nonane-1,9-diyl group, decane-1,10-diyl group, undecane-1,11-diyl group, dodecane-1,12-diyl group, tridecane-1,13-diyl group, tetradecane-1,14-diyl group, pentadecane-1,15-diyl group, and hexadecane-1,16-diyl group).

The sulfonium salt (Q) may be synthesized according to the following scheme, for example. The specific procedure is as follows. In the presence of a base (such as potassium hydroxide), 1-fluoro-2-methyl-4-nitrobenzene represented by the following formula (b1) and a compound represented by the following formula (b2) are subjected to reaction. Thus, a nitro compound represented by the following formula (b3) is obtained. The resultant is reduced in the presence of reduced iron to obtain an amine compound represented by the following formula (b4). The resulting amine compound is subjected to reaction with a nitrite (for example, sodium nitrite) represented by MaNO$_2$ (wherein Ma represents a metal atom, such as an alkali metal atom (for example, a sodium atom)) to obtain a diazo compound. Then, the resulting diazo compound is mixed with a cuprous halide represented by CuX' (wherein X' represents a halogen atom, such as a bromine atom; the same applies hereinafter) and a hydrogen halide represented by HX', and a reaction is allowed to proceed. Thus, a halide represented by the following formula (b5) is obtained. The resulting halide and magnesium are used to prepare Grignard reagent, and this Grignard reagent is subjected to reaction with a sulfoxide compound represented by the following formula (b6) in the presence of chlorotrimethylsilane. Thus, a sulfonium salt represented by the following formula (b7) can be obtained. The resulting sulfonium salt is subjected to reaction with a salt represented by Mb$^+$X'''$^-$ (wherein Mb$^+$ represents a metal cation, such as an alkali metal cation (for example, a potassium ion) and X'''$^-$ represents a monovalent anion represented by X$^-$ (except halide anions)) for salt exchange. Thus, a sulfonium salt represented by the following formula (b8) can be obtained. In the following formulae (b2) to (b8), each of R$^1$ to R$^3$ and A$^1$ is the same as defined above regarding the formula (a1).

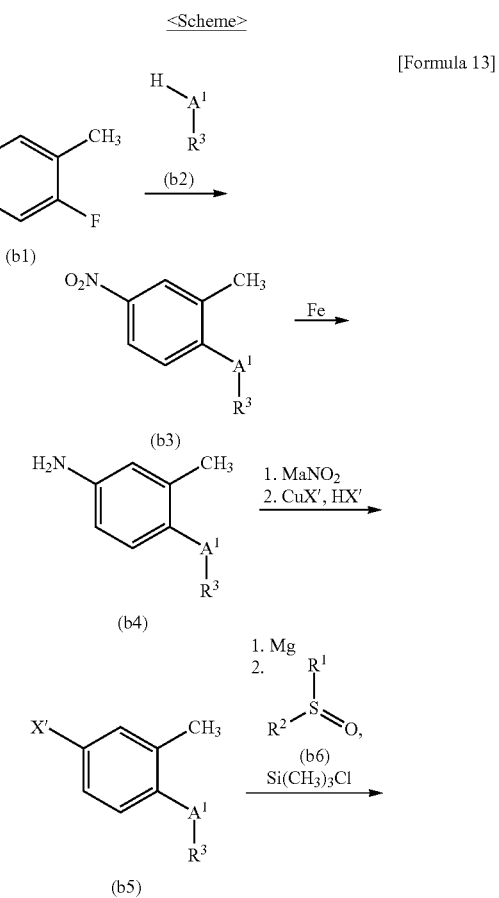

[Formula 13]

-continued

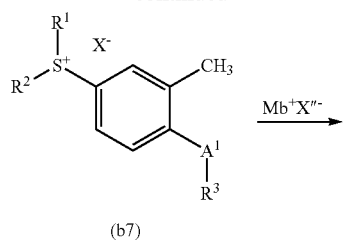

(b7)

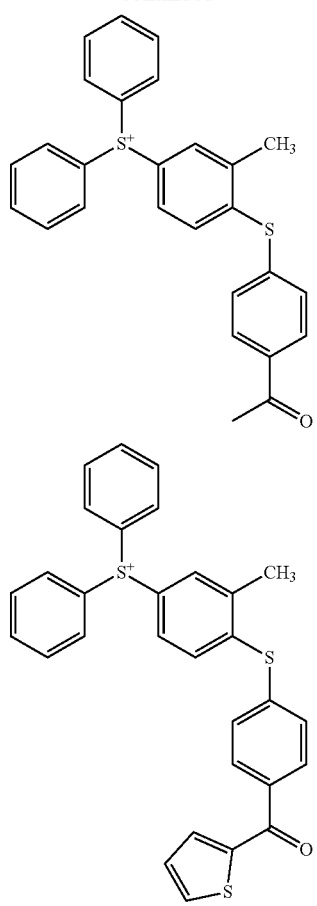

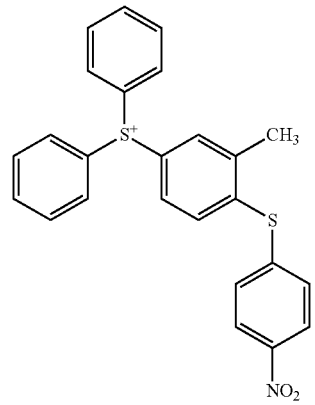

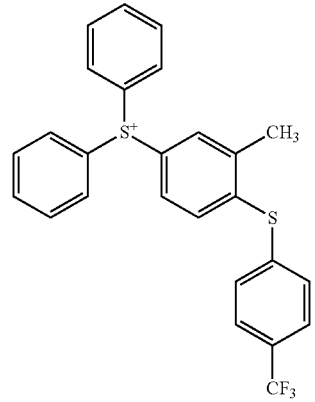

(b8)

Specific examples of a cation portion of the sulfonium salt (Q) represented by the formula (a1) include the following. Specific examples of an anion portion of the sulfonium salt (Q) represented by the formula (a1) include conventionally known ones including those mentioned in the description above regarding $X^-$. The sulfonium salt (Q) represented by the formula (a1) may be synthesized by the scheme described above. The resulting product thus synthesized may be subjected to salt exchange, as needed, so that the cation portion is paired with a desired anion portion. It is particularly preferable that the cation portion be paired with an anion represented by $R^{x1}_c BY_{4-c}^-$ (wherein $R^{x1}$ represents a phenyl group formed by substituting at least a part of hydrogen atoms with a halogen atom or an electron-withdrawing group; Y represents a halogen atom; and c represents an integer of 1 or more and 4 or less).

[Formula 14]

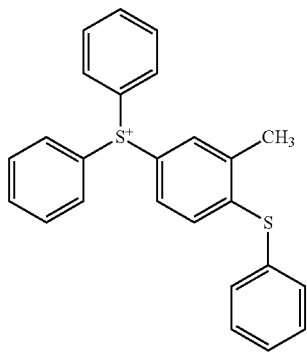

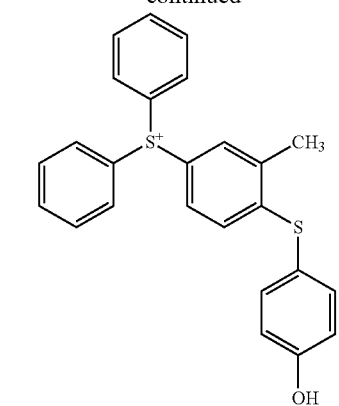
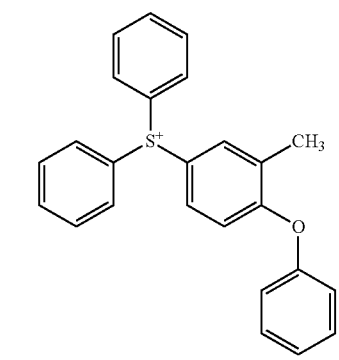
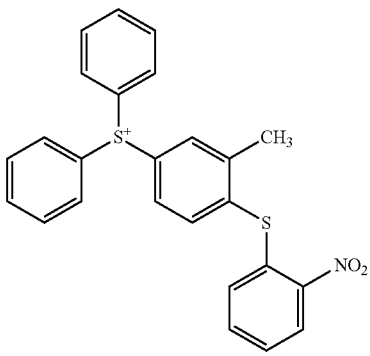
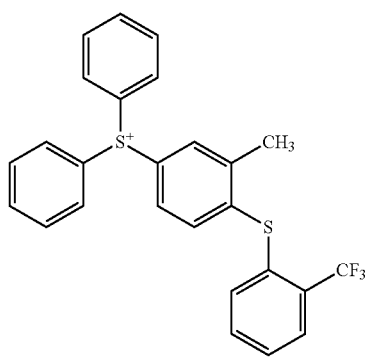
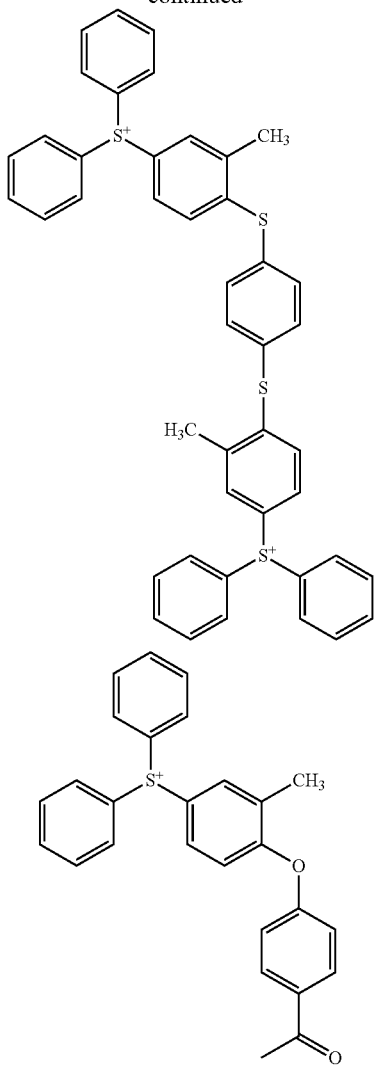
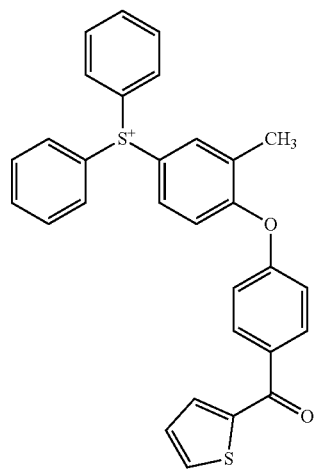 [SMILES: O=C(c1ccc(Sc2ccc([S+](c3ccccc3)c3ccccc3)cc2)cc1)c1cccs1]
Among the preferable cation portions described above, a cation portion represented by the following formula is more preferable.

[Formula 15]

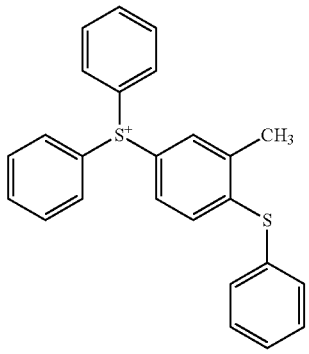

The cationic polymerization initiator (A) may further contain an additional cationic polymerization initiator other than the sulfonium salt (Q), in addition to the sulfonium salt (Q). The content of the sulfonium salt (Q) in the cationic polymerization initiator (A) is not particularly limited but typically the content is preferably 70 mass % or higher, more preferably 80 mass % or higher, particularly preferably 90 mass % or higher, most preferably 100 mass %.

(Additional Cationic Polymerization Initiator)

As the additional cationic polymerization initiator other than the sulfonium salt (Q), any of various cationic polymerization initiators conventionally used for cationic polymerization of a vinyl ether compound may be used with no particular limitation. The additional cationic polymerization initiator is preferably an onium salt, such as an iodonium salt or a sulfonium salt, more preferably a sulfonium salt except the sulfonium salt (Q).

Hereinafter, that other sulfonium salt except the sulfonium salt (Q) is also called "sulfonium salt (Q')". That other sulfonium salt called sulfonium salt (Q') preferably contains $R^{x1}{}_{c}BY_{4-c}^{-}$ described above as the monovalent anion $X^{-}$, as in the case of the sulfonium salt (Q).

Examples of the sulfonium salt (Q') containing the monovalent anion represented by $R^{x1}{}_{c}BY_{4-c}^{-}$ include a sulfonium salt represented by the following formula (a1'):

[Formula 16]

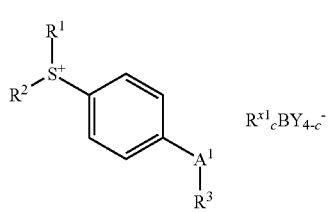

(a1')

(wherein $R^1$, $R^2$, $R^3$, $A^1$, $R^{x1}$, Y, and c are the same as defined above).

Specific examples of a cation portion of the sulfonium salt (Q') represented by the formula (a1') include the following.

[Formula 17]

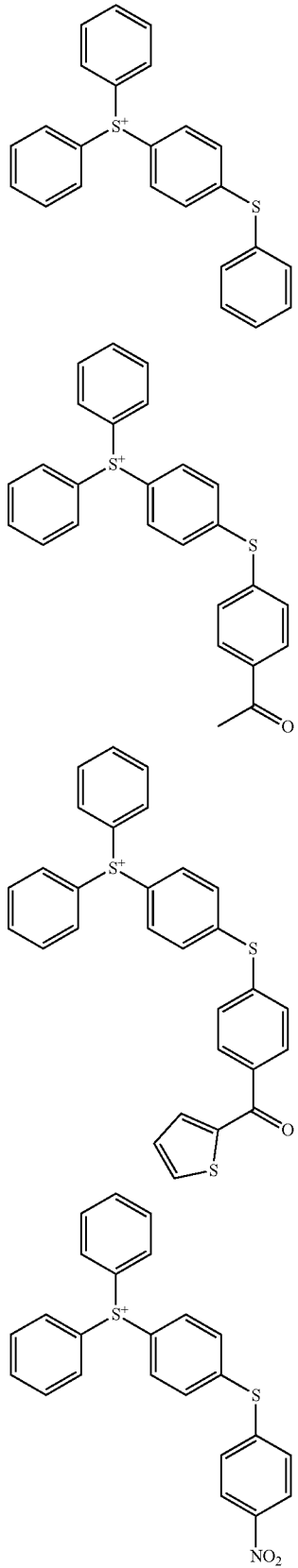

-continued
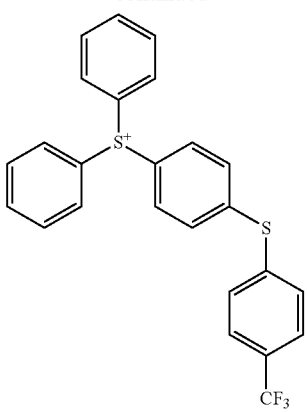
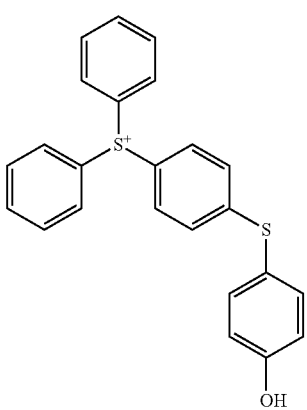
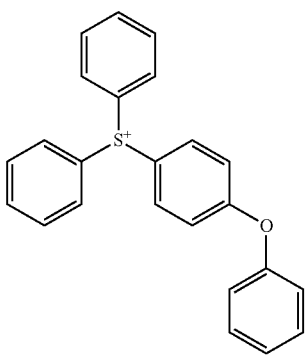
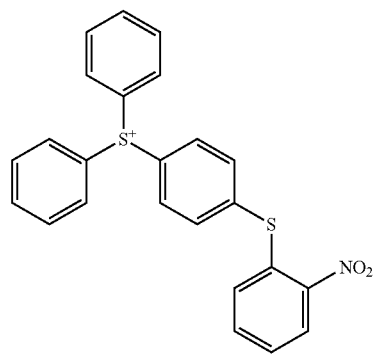
-continued
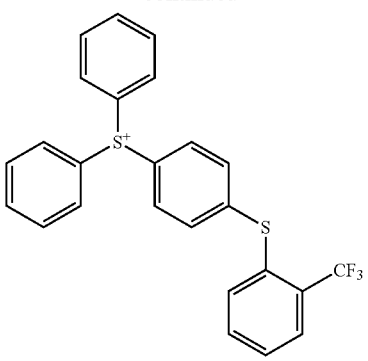
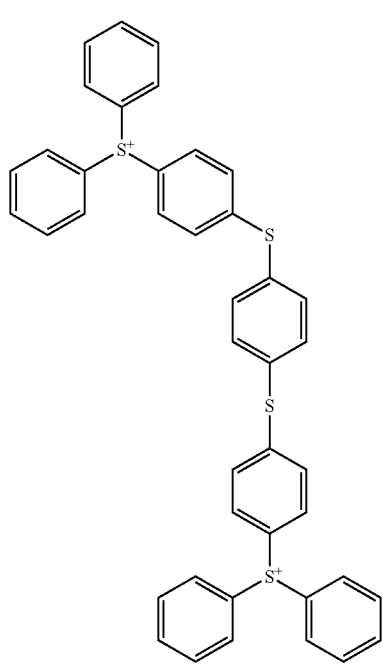
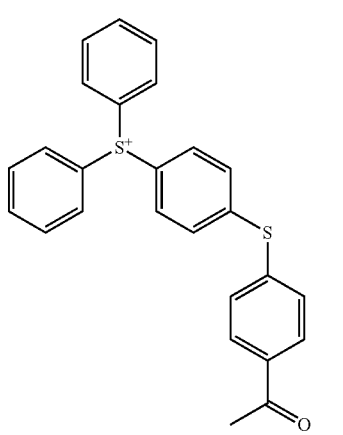

-continued

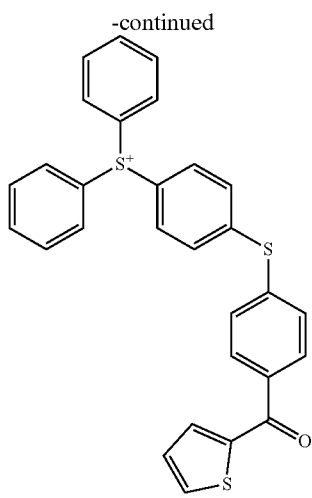

Typical examples of the cation portion of the sulfonium salt (Q') include the following.

[Formula 18]

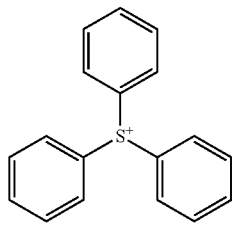

The content of the cationic polymerization initiator (A) in the curable composition is not particularly limited, provided that the curing of the curable composition favorably proceeds. From the viewpoint that the curable composition is likely to be favorably cured, the content is typically and preferably 0.01 parts by mass or more and 30 parts by mass or less, more preferably 0.1 parts by mass or more and 10 parts by mass or less, and particularly preferably 0.1 parts by mass or more and 5 parts by mass or less, in relation to 100 parts by mass of the aromatic vinyl ether compound (B) described below.

<Aromatic Vinyl Ether Compound (B)>

The curable composition comprises the aromatic vinyl ether compound (B). The aromatic vinyl ether compound (B) has an aromatic group substituted with a vinyloxy group. The aromatic vinyl ether compound (B) may have a vinyloxy group bonded to an aliphatic group, provided that the aromatic vinyl ether compound has an aromatic group substituted with a vinyloxy group. The curable composition may comprise two or more different types of the aromatic vinyl ether compound (B) in combination.

The number of vinyloxy groups in the aromatic vinyl ether compound (B) is not particularly limited, provided that the number is 1 or more; and the number of vinyloxy groups here is preferably 2 or more, and more preferably 2. In other words, the aromatic vinyl ether compound (B) is preferably an aromatic polyvinyl ether compound having two or more vinyloxy groups, more preferably an aromatic divinyl ether compound having two vinyloxy groups.

A monovalent or polyvalent organic group contained in the aromatic vinyl ether compound (B) and serving as the core to which a vinyl ether group is bonded may be a hydrocarbon group and may be an organic group having a heteroatom. Examples of the heteroatom include O, S, N, P, and halogen atoms. For excellent properties of the cured product such as excellent transparency and excellent hardness, the aromatic vinyl ether compound (B) preferably contains a fluorene ring as the aromatic ring.

Specific examples of an aromatic monovinyl ether compound include vinylphenyl ether, 4-vinyloxytoluene, 3-vinyloxytoluene, 2-vinyloxytoluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxynaphthalene, 2-vinyloxynaphthalene, 2-vinyloxyfluorene, 3-vinyloxyfluorene, 4-vinyloxy-1,1'-biphenyl, 3-vinyloxy-1,1'-biphenyl, 2-vinyloxy-1,1'-biphenyl, 6-vinyloxytetralin, and 5-vinyloxytetralin.

Specific examples of the aromatic divinyl ether compound include 1,4-divinyloxybenzene, 1,3-divinyloxybenzene, 1,2-divinyloxybenzene, 1,4-divinyloxynaphthalene, 1,3-divinyloxynaphthalene, 1,2-divinyloxynaphthalene, 1,5-divinyloxynaphthalene, 1,6-divinyloxynaphthalene, 1,7-divinyloxynaphthalene, 1,8-divinyloxynaphthalene, 2,3-divinyloxynaphthalene, 2,6-divinyloxynaphthalene, 2,7-divinyloxynaphthalene, 1,2-divinyloxyfluorene, 3,4-divinyloxyfluorene, 2,7-divinyloxyfluorene, 4,4'-divinyloxybiphenyl, 3,3'-divinyloxybiphenyl, 2,2'-divinyloxybiphenyl, 3,4'-divinyloxybiphenyl, 2,3'-divinyloxybiphenyl, 2,4'-divinyloxybiphenyl, and bisphenol A divinyl ether.

Alternatively, the aromatic vinyl ether compound (B) is preferably a compound represented by the following formula (1).

[Formula 19]

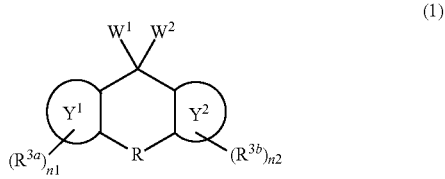

(1)

In the formula (1), $W^1$ and $W^2$ independently represent a group represented by the following formula (2), a group represented by the following formula (3), or a hydroxy group; at least one of $W^1$ and $W^2$ is a group represented by the following formula (2); and more preferably each of $W^1$ and $W^2$ is a group represented by the following formula (2).

[Formula 20]

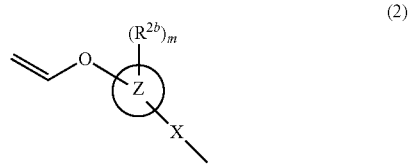

(2)

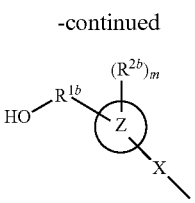

(3)

In the formulae (2) and (3), examples of the ring Z include benzene rings and fused polycyclic aromatic hydrocarbon rings [for example, fused di- to tetracyclic aromatic hydrocarbon rings such as fused dicyclic hydrocarbon rings (for example, $C_{8-20}$ fused dicyclic hydrocarbon rings, preferably $C_{10-16}$ fused dicyclic hydrocarbon rings, such as naphthalene rings) and fused tricyclic aromatic hydrocarbon rings (for example, anthracene rings or phenanthrene rings). The ring Z is preferably a benzene ring or a naphthalene ring, more preferably a naphthalene ring. When both $W^1$ and $W^2$ represent a group represented by the formula (2), or when one of $W^1$ and $W^2$ represents a group represented by the formula (2) while the other represents a group represented by the formula (3), the ring Z contained in $W^1$ may be the same as or different from the ring Z contained in $W^2$. For example, one of the rings may represent a benzene ring with the other ring representing a naphthalene ring or the like. Particularly preferably, both the rings represent a naphthalene ring. The position of substitution of the ring Z bonded through X to a carbon atom to which both $W^1$ and $W^2$ are directly connected is not particularly limited. For example, when the ring Z represents a naphthalene ring, the group corresponding to the ring Z bonded to the carbon atom may be, for example, a 1-naphthyl group or a 2-naphthyl group.

In the formulae (2) and (3), X independently represents a single bond or a group represented by —S—, typically a single bond.

In the formula (3), examples of Rib include single bonds; and alkylene groups having 1 or more and 4 or less carbon atoms such as methylene, ethylene, trimethylene, propylene, and butane-1,2-diyl groups. Single bonds and $C_{2-4}$ alkylene groups (particularly $C_{2-3}$ alkylene groups such as ethylene and propylene groups) are preferred, and a single bond is more preferred.

In the formulae (2) and (3), examples of $R^{2b}$ include monovalent hydrocarbon groups such as alkyl groups (for example, $C_{1-12}$ alkyl groups, preferably $C_{1-8}$ alkyl groups, more preferably $C_{1-6}$ alkyl groups such as methyl, ethyl, propyl, isopropyl, and butyl groups), cycloalkyl groups (for example, $C_{5-10}$ cycloalkyl groups, preferably $C_{5-8}$ cycloalkyl groups, more preferably $C_{5-6}$ cycloalkyl groups such as a cyclohexyl group), aryl groups (for example, $C_{6-14}$ aryl groups, preferably $C_{6-10}$ aryl groups, more preferably $C_{6-8}$ aryl groups such as phenyl, tolyl, xylyl, and naphthyl groups), and aralkyl groups (for example, $C_{6-10}$ aryl-$C_{1-4}$ alkyl groups such as benzyl and phenethyl groups); a hydroxyl group; groups represented by —$OR^{3a}$ wherein $R^{1a}$ represents a monovalent hydrocarbon group (for example, the above-exemplified monovalent hydrocarbon group) such as alkoxy groups (for example, $C_{1-12}$ alkoxy groups, preferably $C_{1-8}$ alkoxy groups, more preferably $C_{1-6}$ alkoxy groups such as methoxy, ethoxy, propoxy, and butoxy groups), cycloalkoxy groups ($C_{5-10}$ cycloalkoxy groups such as cyclohexyloxy groups), aryloxy groups ($C_{6-10}$ aryloxy groups such as phenoxy group), and aralkyloxy groups (for example, $C_{6-10}$ aryl-$C_{1-4}$ alkyloxy groups such as a benzyloxy group); groups represented by —$SR^{3b}$ wherein $R^{3b}$ represents a monovalent hydrocarbon group (for example, the above-exemplified monovalent hydrocarbon group) such as alkylthio groups (for example, $C_{1-12}$ alkylthio groups, preferably $C_{1-8}$ alkylthio groups, more preferably $C_{1-6}$ alkylthio groups such as methylthio, ethylthio, propylthio, and butylthio groups), cycloalkylthio groups (for example, $C_{5-10}$ cycloalkylthio groups such as a cyclohexylthio group), aryl thio groups ($C_{6-10}$ aryl thio groups such as a phenylthio group), and aralkyl thio groups (for example, $C_{6-10}$ aryl-$C_{1-4}$ alkylthio groups such as a benzylthio group); acyl groups ($C_{1-6}$ acyl groups such as an acetyl group); alkoxycarbonyl groups (for example, $C_{1-4}$ alkoxycarbonyl groups such as methoxycarbonyl group); halogen atoms (for example, a fluorine atom, a chlorine atom, a bromine atom, and an iodine atom); a nitro group; a cyano group; a mercapto group; a carboxyl group; an amino group; a carbamoyl group; groups represented by —$NHR^{3c}$ wherein $R^{3c}$ represents a monovalent hydrocarbon group (for example, the above-exemplified monovalent hydrocarbon group) such as alkylamino groups ($C_{1-12}$ alkylamino groups, preferably $C_{1-8}$ alkylamino groups, more preferably $C_{1-6}$ alkylamino groups such as a methylamino group, an ethylamino group, a propylamino group, and a butylamino group), cycloalkylamino groups (for example, $C_{5-10}$ cycloalkylamino groups such as a cyclohexylamino group), arylamino groups ($C_{6-10}$ aryl amino groups such as a phenylamino group), and aralkyl amino groups (for example, $C_{6-10}$ aryl-$C_{1-4}$ alkylamino groups such as a benzylamino group);

groups represented by —$N(R^{3d})_2$ wherein each $R^{3d}$ independently represents a monovalent hydrocarbon group (for example, the above-exemplified monovalent hydrocarbon group) such as dialkylamino groups (di($C_{1-12}$ alkyl)amino groups, preferably di ($C_{1-8}$ alkyl)amino groups, more preferably di ($C_{1-6}$ alkyl)amino groups such as a dimethylamino group, a diethylamino group, a dipropylamino group, and a dibutylamino group), dicycloalkylamino groups (di($C_{5-10}$ cycloalkyl)amino groups such as a dicyclohexylamino group), diaryl amino groups (di($C_{6-10}$ aryl)amino groups such as a diphenylamino group), and diaralkyl amino groups (for example, di ($C_{6-10}$ aryl-$C_{1-4}$ alkyl)amino groups such as a dibenzylamino group); (meth)acryloyloxy groups; a sulfo group; and the above monovalent hydrocarbon groups, groups represented by —$OR^{3a}$, groups represented by —$SR^{3b}$, acyl groups, alkoxycarbonyl groups, groups represented by —$NHR^{3c}$, or groups obtained by substituting at least a part of hydrogen atoms bonded to carbon atoms contained in groups represented by —$N(R^{3d})_2$ with the above monovalent hydrocarbon group, a hydroxyl group, a group represented by —$OR^{3a}$, a group represented by —$SR^{3b}$, an acyl group, an alkoxycarbonyl group, a halogen atom, a nitro group, a cyano group, a mercapto group, a carboxyl group, an amino group, a carbamoyl group, a group represented by —$NHR^{3c}$, a group represented by —$N(R^{3d})_2$, a (meth)acryloyloxy group, a mesyloxy group, or a sulfo group [for example, alkoxyaryl groups (for example, $C_{1-4}$ alkoxy $C_{6-10}$ aryl groups such as a methoxyphenyl group), alkoxycarbonylaryl groups (for example, $C_{1-4}$ alkoxycarbonyl $C_{6-10}$ aryl groups such as a methoxycarbonylphenyl group and an ethoxycarbonylphenyl group)].

Among them, typical examples of $R^{2b}$ may include monovalent hydrocarbon groups, groups represented by —$OR^{3a}$, groups represented by —$SR^{3b}$, acyl groups, alkoxycarbonyl groups, halogen atoms, nitro group, cyano group, groups represented by —$NHR^{3c}$, and groups represented by —$N(R^{3d})_2$.

Examples of preferred $R^{2b}$ include monovalent hydrocarbon groups [for example, alkyl groups (for example, $C_{1-6}$ alkyl groups), cycloalkyl groups (for example, $C_{5-8}$ cycloalkyl groups), aryl groups (for example, $C_{6-10}$ aryl groups), and aralkyl groups (for example, $C_{6-8}$ aryl-$C_{1-2}$ alkyl groups)], and alkoxy groups (for example, $C_{1-4}$ alkoxy groups). In particular, preferably, $R^{2b}$ represents a monovalent hydrocarbon group such as an alkyl group [for example, a $C_{1-4}$ alkyl group (particularly a methyl group)], an aryl group [for example, a $C_{6-10}$ aryl group (particularly a phenyl group)] (particularly an alkyl group).

When m is an integer of 2 or more, $R^{2b}$s may be different from or the same as each other. When both $W^1$ and $W^2$ represent a group represented by the formula (2), or when one of $W^1$ and $W^2$ represents a group represented by the formula (2) while the other represents a group represented by the formula (3), $R^{2b}$ contained in $W^1$ may be the same as or different from $R^{2b}$ contained in $W^2$.

In the formulae (2) and (3), the number m of $R^{2b}$s can be selected depending on the type of the ring Z, and may be, for example, 0 or more and 4 or less, preferably 0 or more and 3 or less, and more preferably 0 or more and 2 or less. When both $W^1$ and $W^2$ represent a group represented by the formula (2), or when one of $W^1$ and $W^2$ represents a group represented by the formula (2) while the other represents a group represented by the formula (3), m in $W^1$ may be the same as or different from m in $W^2$.

In the formula (1), examples of the ring $Y^1$ and the ring $Y^2$ include benzene rings and fused polycyclic aromatic hydrocarbon rings [for example, fused di- to tetracyclic aromatic hydrocarbon rings such as fused dicyclic hydrocarbon rings (for example, $C_{8-20}$ fused dicyclic hydrocarbon rings, preferably $C_{10-16}$ fused dicyclic hydrocarbon rings such as naphthalene rings), and fused tricyclic aromatic hydrocarbon rings (for example, anthracene rings and phenanthrene rings)]. The ring $Y^1$ and the ring $Y^2$ are preferably a benzene ring or a naphthalene ring. The ring $Y^1$ and the ring $Y^2$ may be the same as or different from each other. For example, one of the rings may represent a benzene ring with the other ring representing a naphthalene ring or the like.

In the formula (1), R represents a single bond, an optionally substituted methylene group, an ethylene group that is optionally substituted and may contain a hetero atom between two carbon atoms, a group represented by —O—, a group represented by —NH—, or a group represented by —S—, and is typically a single bond. Here, examples of substituents include a cyano group, halogen atoms (such as fluorine, chlorine, and bromine atoms), monovalent hydrocarbon groups [for example, alkyl groups ($C_{1-6}$ alkyl groups such as methyl, ethyl, propyl, isopropyl, butyl, and t-butyl groups), and aryl groups ($C_{6-10}$ aryl groups such as phenyl groups)]. Examples of hetero atoms include an oxygen atom, a nitrogen atom, a sulfur atom, or a silicon atom.

In the formula (1), general examples of $R^{3a}$ and $R^{3b}$ include nonreactive substituents, for example, cyano groups, halogen atoms (for example, fluorine, chlorine, and bromine atoms), monovalent hydrocarbon groups [for example, alkyl groups and aryl groups ($C_{6-10}$ aryl groups such as phenyl groups)]. A cyano group or an alkyl group is preferred, and an alkyl group is particularly preferred. Examples of alkyl groups include $C_{1-6}$ alkyl groups (for example, $C_{1-4}$ alkyl groups, particularly methyl groups) such as methyl, ethyl, propyl, isopropyl, butyl, and t-butyl groups. When n1 is an integer of 2 or more, $R^{3a}$s may be the same as or different from each other. When n2 is an integer of 2 or more, $R^{3b}$s may be the same as or different from each other. Further, $R^{3a}$ and $R^{3b}$ may be the same as or different from each other. The position of bonding $R^{3a}$ and $R^{3b}$ to the ring $Y^1$ and the ring $Y^2$ (position of substitution) is not particularly limited. The number of substituents n1 and n2 is preferably 0 (zero) or 1, particularly preferably 0 (zero). n1 and n2 may be the same as or different from each other.

Compounds represented by the formula (1) maintain excellent optical properties and thermal properties and, at the same time, have high reactivity by virtue of the presence of a vinyloxy group. In particular, when the ring $Y^1$ and the ring $Y^2$ represent a benzene ring with R representing a single bond, compounds represented by the formula (1) have a fluorene skeleton and thus possess further improved optical properties and thermal properties. The compounds represented by the formula (1) can be polymerized and thus function as polymerizable monomers. In particular, when both $W^1$ and $W^2$ represent a group represented by the formula (2), the compounds represented by the formula (1) can be cationically polymerized and thus can function as cationically polymerizable monomers. Further, the compounds represented by the formula (1) are preferred because these can provide cured products having a high hardness.

Compounds represented by the formula (1) can be used in various applications, for example, alignment films and flattening films (alignment films and flattening films used, for example, in liquid crystal displays and organic EL displays); resist underlying films such as antireflection films, interlayer insulating films, and carbon hard masks; spacers and partition walls such as liquid crystal displays and organic EL displays; pixels and black matrixes in color filters of liquid crystal displays; display devices such as liquid crystal displays and organic EL displays; optical members such as lenses (for example, microlenses), optical fibers, light waveguides, prism sheets, holograms, high refractive index films, and retroreflection films; low moisture permeable membranes (for example, low moisture permeable membranes used as water vapor barrier layers); optical materials; and semiconductor materials.

Among the compounds represented by the formula (1), particularly preferred examples thereof include compounds represented by the following formulae.

[Formula 21]

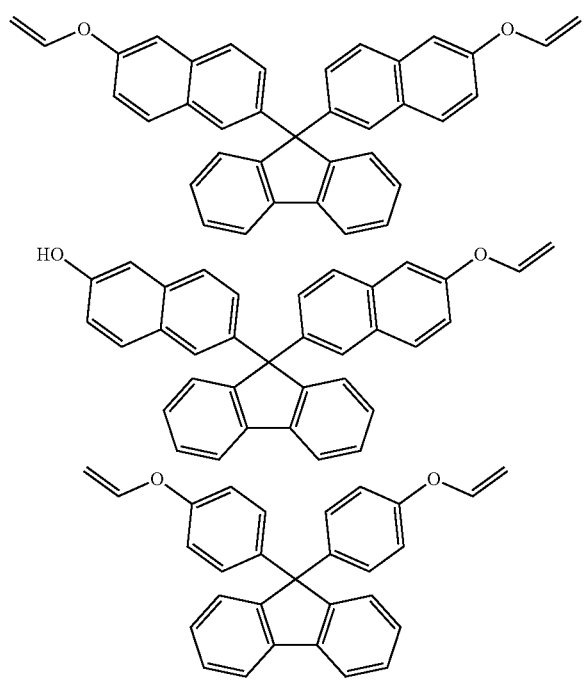

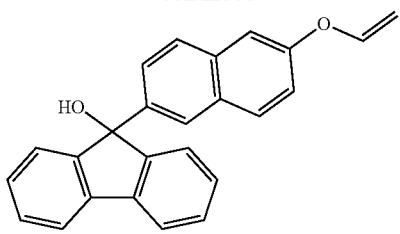
[Formula 22]
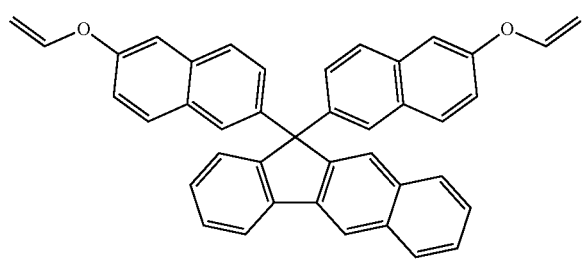
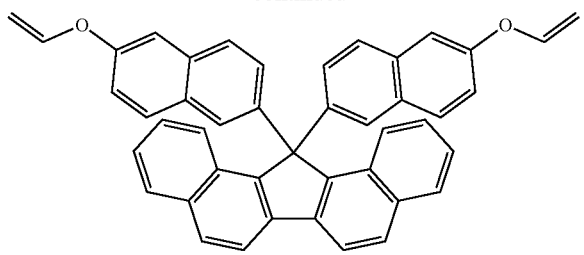
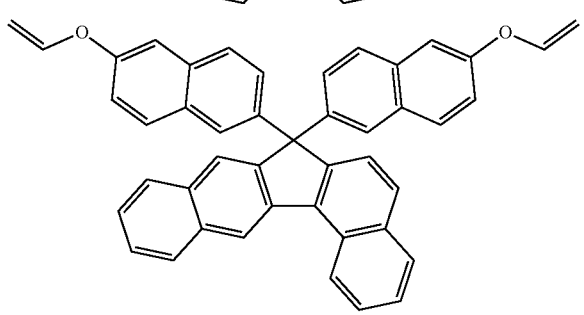
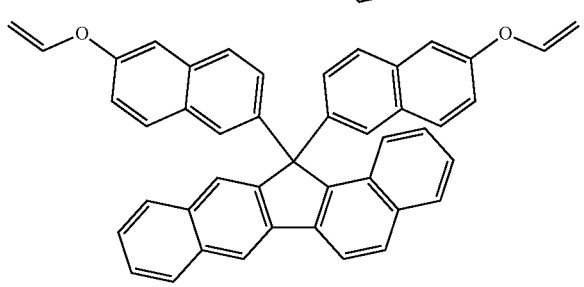
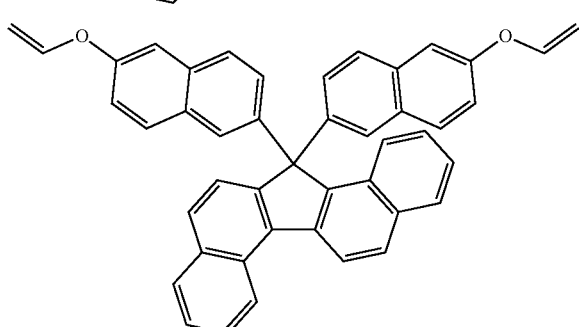
[Formula 23]
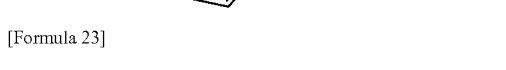
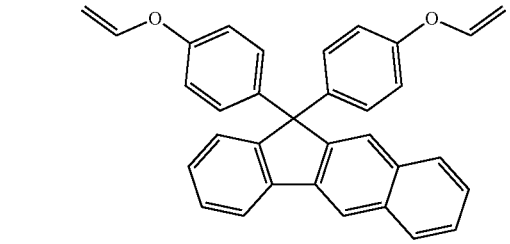
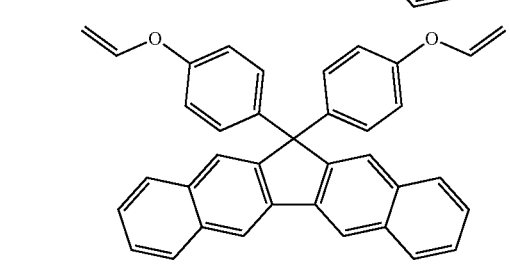

-continued
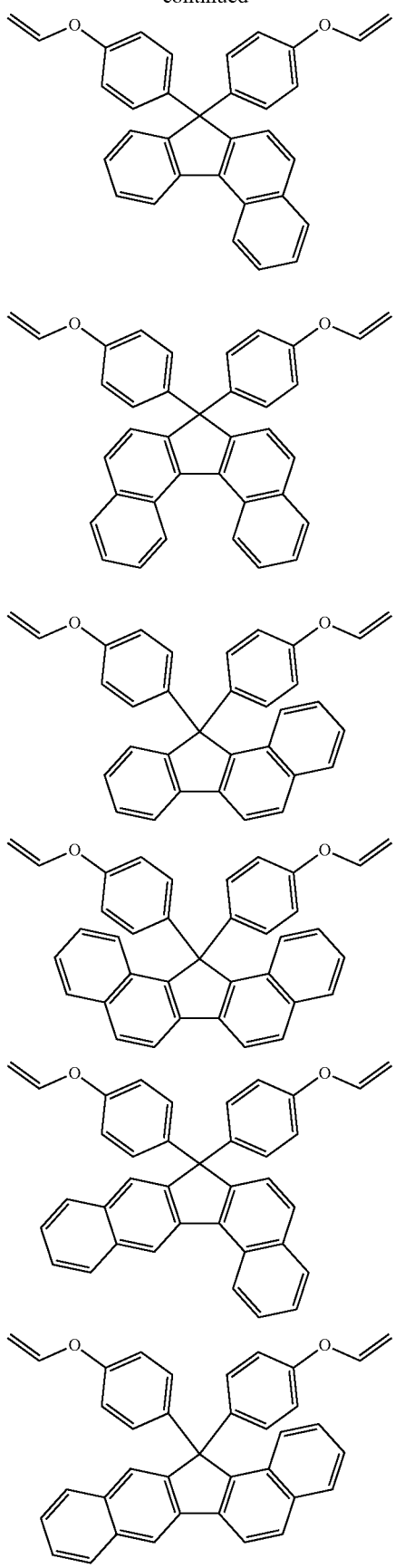
-continued
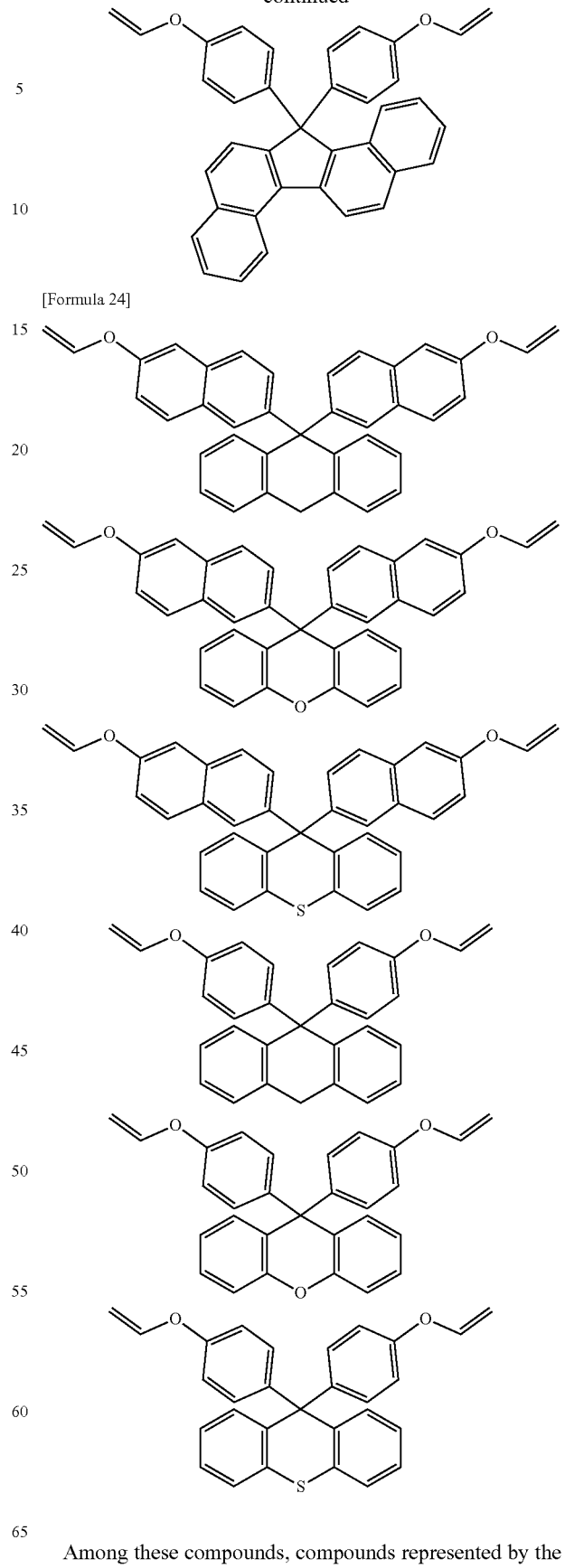
Among these compounds, compounds represented by the following formulae are preferable.

[Formula 25]

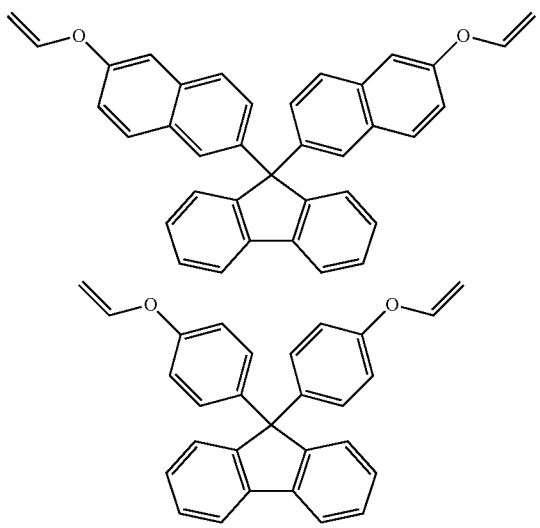

The content of the aromatic vinyl ether compound (B) in the curable composition is not particularly limited, provided that the curing of the curable composition favorably proceeds. From the viewpoint that the curable composition is likely to be favorably cured, the content is typically and preferably 30 parts by mass or more and 99.9 parts by mass or less, more preferably 40 parts by mass or more and 99.5 parts by mass or less, and particularly preferably 50 parts by mass or more and 99 parts by mass or less, in relation to 100 parts by mass of the total solid content of the curable composition.

<Sensitizing Agent (C)>

The curable composition may comprise a sensitizing agent (C). As the sensitizing agent, any known sensitizing agent conventionally used in combination with various cationic polymerization initiators may be used with no particular limitation. Specific examples of the sensitizing agent include anthracene compounds such as anthracene, 9,10-dibutoxyanthracene, 9,10-dimethoxyanthracene, 9,10-diethoxyanthracene, 2-ethyl-9,10-dimethoxyanthracene, and 9,10-dipropoxyanthracene; pyrene; 1,2-benzanthracene; perylene; tetracene; coronene; thioxanthone compounds such as thioxanthone, 2-methylthioxanthone, 2-ethylthioxanthone, 2-chlorothioxanthone, 2-isopropylthioxanthone, and 2,4-diethylthioxanthone; phenothiazine compounds such as phenothiazine, N-methylphenothiazine, N-ethylphenothiazine, and N-phenylphenothiazine; xanthone; naphthalene compounds such as 1-naphthol, 2-naphthol, 1-methoxynaphthalene, 2-methoxynaphthalene, 1,4-dihydroxynaphthalene, and 4-methoxy-1-naphthol; ketones such as dimethoxyacetophenone, diethoxyacetophenone, 2-hydroxy-2-methyl-1-phenylpropan-1-one, 4'-isopropyl-2-hydroxy-2-methylpropiophenone, and 4-benzoyl-4'-methyldiphenyl sulfide; carbazole compounds such as N-phenylcarbazole, N-ethylcarbazole, poly-N-vinylcarbazole, and N-glycidylcarbazole; chrysene compounds such as 1,4-dimethoxychrysene and 1,4-di-α-methylbenzyloxychrysene; phenanthrene compounds such as 9-hydroxyphenanthrene, 9-methoxyphenanthrene, 9-hydroxy-10-methoxyphenanthrene, and 9-hydroxy-10-ethoxyphenanthrene. The sensitizing agent may be used in a combination of two or more thereof.

The amount of the sensitizing agent (C) to use is not particularly limited and is preferably 1 parts by mass or more and 300 parts by mass or less, more preferably 5 parts by mass or more and 200 parts by mass or less, in relation to 100 parts by mass of the cationic polymerization initiator (A). When the amount of the sensitizing agent (C) is within this range, a desired level of sensitizing action is likely to be obtained.

<Other Ingredients>

The curable composition may include, as needed, additives such as a surfactant, a thermal polymerization inhibitor, an anti-foaming agent, a silane coupling agent, a coloring agent (a pigment and/or a dye), a resin (a known thermosetting resin (such as an epoxy resin), a thermoplastic resin, and/or an alkali-soluble resin, for example), an inorganic filler, and/or an organic filler. Each of these additives may be a conventionally known one. Examples of the surfactant include compounds such as anionic surfactants, cationic surfactants, and nonionic surfactants. Examples of the thermal polymerization inhibitor include hydroquinone and hydroquinone monoethyl ether. Examples of the anti-foaming agent include silicone compounds and fluorine compounds. As long as the objects of the present invention are not impaired, the curable composition may include comprise a cationically polymerizable compound, such as a vinyl ether compound or an epoxy compound, that is not the aromatic vinyl ether compound (B) and that has no vinyloxy group on an aromatic group.

In a preferred aspect of this embodiment, the curable composition comprises an epoxy-group-containing fluorene compound for obtaining a cured product with a high refractive index. Typically, a compound represented by the following formula (P1), which contains 9,9-bis(glycidyloxynaphthyl)fluorenes, is more preferable:

[Formula 26]

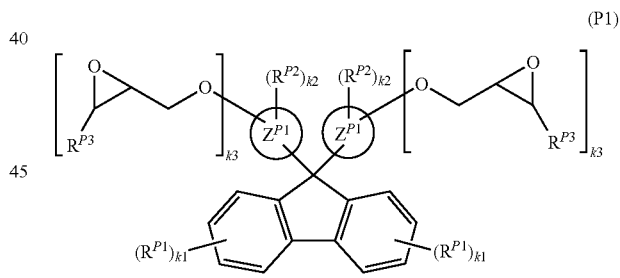

(P1)

(in the formula (P1), a ring $Z^{P1}$ represents a condensed polycyclic aromatic hydrocarbon ring; each of $R^{P1}$ and $R^{P2}$ represents a substituent; $R^{P3}$ represents a hydrogen atom or a methyl group; k1 represents an integer of 0 or more and 4 or less; k2 represents an integer of 0 or more; and k3 represents an integer of 1 or more).

In the formula (P1), examples of the condensed polycyclic aromatic hydrocarbon ring represented by the ring $Z^{P1}$ include condensed di- to tetracyclic hydrocarbon rings, such as condensed dicyclic hydrocarbon rings (for example, condensed dicyclic hydrocarbon rings having 8 or more and 20 or less carbon atoms such as indene ring and naphthalene ring, preferably condensed dicyclic hydrocarbon rings having 10 or more and 16 or less carbon atoms) and condensed tricyclic hydrocarbon rings (for example, anthracene ring and phenanthrene ring). Preferable examples of the condensed polycyclic aromatic hydrocarbon ring include naphthalene ring and anthracene ring, particularly preferably naphthalene ring. The two rings $Z^{P1}$ as substituents at the C9 position of the fluorene may be the same as or different from each other, usually the same as each other.

The position (substitution position) on the ring $Z^{P1}$ at which the ring is bonded to the C9 position of the fluorene is not particularly limited. For example, a naphthyl group as a substituent at the C9 position of the fluorene may be a 1-naphthyl group, a 2-naphthyl group, or the like, particularly preferably a 2-naphthyl group.

Examples of the substituent represented by $R^{P1}$ in the formula (P1) include nonreactive substituents, such as cyano group, halogen atoms (such as fluorine atom, chlorine atom, and bromine atom), and hydrocarbon groups [such as alkyl groups and aryl groups (aryl groups having 6 or more and 10 or less carbon atoms, such as phenyl group)]. In many cases, the substituent is particularly a halogen atom, a cyano group, or an alkyl group (an alkyl group, in particular). Examples of the alkyl group may include alkyl groups having 1 or more and 6 or less carbon atoms, such as methyl group, ethyl group, propyl group, isopropyl group, butyl group, and t-butyl group (for example, alkyl groups having 1 or more and 4 or less carbon atoms, particularly methyl group). When k1 is plural (2 or more), RP's may be different from each other or may be the same as each other. RP's as substituents of the two benzene rings of the fluorene (or the fluorene skeleton) may be the same as or different from each other. The position (substitution position) on a benzene ring of the fluorene to which $R^{P1}$ is bonded is not particularly limited. k1 is preferably 0 or 1, particularly preferably 0. k1s in the two benzene rings of the fluorene may be the same as or different from each other.

Examples of $R^{P2}$ as a substituent of the ring $Z^{P1}$ include hydrocarbon groups, such as alkyl groups (for example, alkyl groups having 1 or more and 12 or less carbon atoms, such as methyl group, ethyl group, propyl group, isopropyl group, and butyl group, preferably alkyl groups having 1 or more and 8 or less carbon atoms, further preferably alkyl groups having 1 or more and 6 or less carbon atoms), cycloalkyl groups (for example, cycloalkyl groups having 5 or more and 8 or less carbon atoms, such as cyclohexyl group, preferably cycloalkyl groups having 5 or 6 carbon atoms), aryl groups (for example, aryl groups having 6 or more and 14 or less carbon atoms, such as phenyl group, tolyl group, and xylyl group, preferably aryl groups having 6 or more and 10 or less carbon atoms, further preferably aryl groups having 6 or more and 8 or less carbon atoms), and aralkyl groups (for example, aralkyl groups formed by bonding an aryl group having 6 or more and 10 or less carbon atoms (such as benzyl group or phenethyl group) and an alkyl group having 1 or more and 4 or less carbon atoms); —OR$^{P4}$ groups [wherein $R^{P4}$ represents a hydrocarbon group (such as the hydrocarbon groups mentioned above)], such as alkoxy groups (for example, alkoxy groups having 1 or more and 8 or less carbon atoms, such as methoxy group, preferably alkoxy groups having 1 or more and 6 or less carbon atoms), cycloalkoxy groups (such as cycloalkyloxy groups having 5 or more and 10 or less carbon atoms), and aryloxy groups (such as aryloxy groups having 6 or more and 10 or less carbon atoms); —SR$^{P4}$ groups (wherein $R^{P4}$ is the same as defined above), such as alkylthio groups (for example, alkylthio groups having 1 or more and 8 or less carbon atoms, such as methylthio group, preferably alkylthio groups having 1 or more and 6 or less carbon atoms); acyl groups (for example, acyl groups having 1 or more and 6 or less carbon atoms, such as acetyl group); alkoxycarbonyl groups (for example, an alkoxycarbonyl group formed by bonding an alkoxy group having 1 or more and 4 or less carbon atoms (such as methoxycarbonyl group) and a carbonyl group); halogen atoms (such as fluorine atom, chlorine atom, bromine atom, and iodine atom); hydroxyl group; nitro group; cyano group; and substituted amino groups (for example, dialkylamino groups, such as dimethylamino group).

Among these, $R^{P2}$ is preferably a hydrocarbon group, an alkoxy group, a cycloalkoxy group, an aryloxy group, an aralkyloxy group, an acyl group, a halogen atom, a nitro group, a cyano group, or a substituted amino group, for example, and $R^{P2}$ is particularly preferably a hydrocarbon group [such as an alkyl group (such as an alkyl group having 1 or more and 6 or less carbon atoms)], an alkoxy group (such as a alkoxy group having 1 or more and 4 or less carbon atoms), or a halogen atom (such as a fluorine atom, a chlorine atom, a bromine atom, or an iodine atom), for example.

When k2 in a single ring $Z^{P1}$ is plural (2 or more), $R^{P2}$s may be different from or the same as each other. $R^{P2}$s on the two rings $Z^{P1}$ may be the same as or different from each other. k2 may be preferably 0 or more and 8 or less, preferably 0 to 6 or less (for example, 1 or more and 5 or less), further preferably 0 or more and 4 or less, and particularly preferably 0 to 2 (for example, 0 or 1). k2s in the two rings $Z^{P1}$ may be the same as or different from each other.

In the formula (P1), $R^{P3}$ is a hydrogen atom or a methyl group and $R^{P3}$ is preferably a hydrogen atom.

In the formula (P1), k3 may be 1 or more, and may be 1 or more and 4 or less, for example, preferably 1 or more and 3 or less, further preferably 1 or 2, particularly preferably 1. k3s in each ring $Z^{P1}$ may be the same as or different from each other, usually the same as each other in many cases. The position substituted with an epoxy-group-containing group is not particularly limited, and the position in each ring $Z^{P1}$ substituted with an epoxy-group-containing group may be any appropriate position. In particular, in many cases, the position in the condensed polycyclic hydrocarbon ring substituted with an epoxy-group-containing group is at least a position on another hydrocarbon ring (for example, the C5 position or the C6 position of a naphthalene ring), where that another hydrocarbon ring is not the hydrocarbon ring that is bonded to the C9 position of the fluorene.

Specific examples of the compound represented by the formula (P1) include compounds that are equivalent to the compounds represented by the formula (P1) in which k3 is 1, such as 9,9-bis(glycidyloxynaphthyl)fluorene [for example, 9,9-bis(6-glycidyloxy-2-naphthyl)fluorene or 9,9-bis(5-glycidyloxy-1-naphthyl)fluorene].

In a preferred aspect of this embodiment, the curable composition comprises a hydroxy-group-containing fluorene compound for obtaining a cured product with a high refractive index. Typically, the curable composition preferably comprises a compound represented by the following formula (P2). In the formula (P2), each of $R^{P1}$, $R^{P2}$, $Z^{P1}$, k1, k2, and k3 is the same as defined above regarding the formula (P1).

[Formula 27]

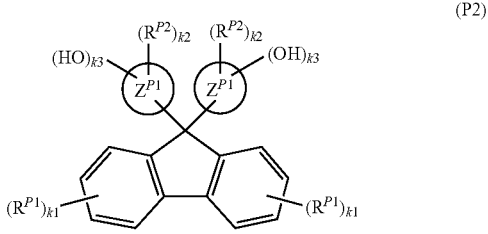

<Solvent (S)>

The curable composition preferably includes a solvent (S) for the purpose of adjusting application properties and viscosity. The solvent (S) is typically an organic solvent. The type of the organic solvent is not particularly limited, provided that the components of the curable composition can be uniformly dissolved or dispersed.

Preferable examples of the organic solvent usable as the solvent (S) include (poly)alkylene glycol monoalkyl ethers such as ethylene glycol monomethyl ether, ethylene glycol monoethyl ether, ethylene glycol-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether; (poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate; other ethers such as diethylene glycol dimethyl ether, diethylene glycol methylethyl ether, diethylene glycol diethyl ether, and tetrahydrofuran; ketones such as methyl ethyl ketone, cyclohexanone, 2-heptanone, and 3-heptanone; alkyl ester lactates such as methyl 2-hydroxypropionate and ethyl 2-hydroxypropionate; other esters such as ethyl 2-hydroxy-2-methylpropionate, methyl 3-methoxypropionate, ethyl 3-methoxy propionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutylacetate, 3-methyl-3-methoxybutylpropionate, ethyl acetate, n-propyl acetate, isopropyl acetate, n-butyl acetate, isobutyl acetate, n-pentyl formate, isopentyl acetate, n-butyl propionate, ethyl butyrate, n-propyl butyrate, isopropyl butyrate, n-butyl butyrate, methyl pyruvate, ethyl pyruvate, n-propyl pyruvate, methyl acetoacetate, ethyl acetoacetate, and ethyl 2-oxobutanoate; aromatic hydrocarbons such as toluene and xylene; amides such as N-methylpyrrolidone, N,N-dimethylformamide, and N,N-dimethylacetamide; and the like. These organic solvents may be used alone or in combination of two or more kinds thereof.

<<Method of Producing Curable Composition>>

By uniformly mixing the components described above at a predetermined ratio, a curable composition can be produced. Examples of the mixing apparatus usable in the production of the curable composition include a twin roll and a triple roll. When the viscosity of the curable composition is low enough, filtration of the curable composition through a filter with a desired aperture size may be carried out, as needed, for removal of insoluble foreign matter.

<<Method of Producing Cured Product>>

The method of producing a cured product is not particularly limited, provided that the method can cure a curable composition that has been shaped into a desired shape. The method of curing is not particularly limited, and may be either heating or light exposure. The method of curing is preferably a combination of heating and light exposure from the viewpoint, in particular, that the curable composition is likely to be favorably cured.

The shape of the shaped product is not particularly limited. The shape of the shaped product is preferably a film shape (a film or a membrane) from the viewpoint that the shaped product is likely to be uniformly irradiated with light or uniformly heated.

A typical method of producing a cured film of the cured product is described below. First, the curable composition is applied to a substrate, such as a glass substrate, to form a coating film. Examples of the method of application include methods in which a contact transfer-type coating applicator such as a roll coater, a reverse coater, or a bar coater or a non-contact type coating applicator such as a spinner (a rotary coating applicator), a slit coater, or a curtain flow coater is used. An alternative method may be as follows: the viscosity of the curable composition is first adjusted to fall within an appropriate range, then the curable composition is applied by a printing method, such as ink-jet printing or screen printing, and then patterning is carried out to form a coating film having a desired shape.

Then, a volatile component such as the solvent (S) is removed as needed and the resulting coating film is dried. The method of drying is not particularly limited. Examples of the method include a method in which the coating film is dried under reduced pressure in a vacuum dryer (VCD) at room temperature and then dried on a hot plate at a temperature of 80° C. or higher and 120° C. or lower, preferably 90° C. or higher and 100° C. or lower, for 60 seconds or longer and 120 seconds or shorter. After forming the coating film in this manner, the coating film is subjected to at least one of light exposure and heating. Light exposure is carried out by irradiation with an active energy ray such as excimer laser light. The dose of energy of irradiation varies depending on the composition of the curable composition, and is preferably 30 mJ/cm$^2$ or more and 2000 mJ/cm$^2$ or less, more preferably 50 mJ/cm$^2$ or more and 500 mJ/cm$^2$ or less, for example. The temperature at which the heating is carried out is not particularly limited. The heating temperature is preferably 180° C. or higher and 280° C. or lower, more preferably 200° C. or higher and 260° C. or lower, and particularly preferably 220° C. or higher and 250° C. or lower. Typically, the duration of the heating is preferably 1 minute or longer and 60 minutes or shorter, more preferably 10 minutes or longer and 50 minutes or shorter, and particularly preferably 20 minutes or longer and 40 minutes or shorter.

From the viewpoint that the curable composition is likely to be particularly favorably cured, it is preferable that both of light exposure and heating are carried out for the curable composition that has been shaped into a desired shape.

The cured product thus formed, particularly the cured film thus formed, is suitable for use in various applications, such as insulating films, antireflection films, interlayer insulating films, carbon hard masks, display panel materials (flattening films, black matrixes, pixels in color filters, and partition walls and spacers for organic ELs), and optical members (lenses, microlenses, optical fibers, light waveguides, prism sheets, holograms, high refractive index films, and retroreflection films).

EXAMPLES

Hereinafter, the present invention will be described more specifically with examples, but the scope of the present invention is not limited to these examples.

Example 1 and Comparative Examples 1 to 3

In examples and comparative examples, A-1 to A-4 described below were used as a cationic polymerization initiator.

[Formula 28]

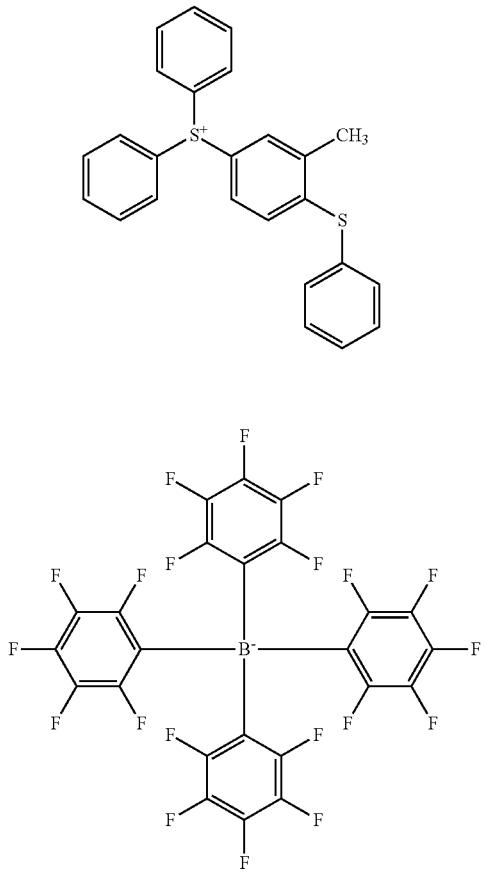

[Formula 29]

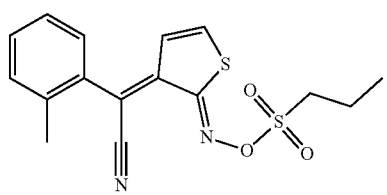

[Formula 30]

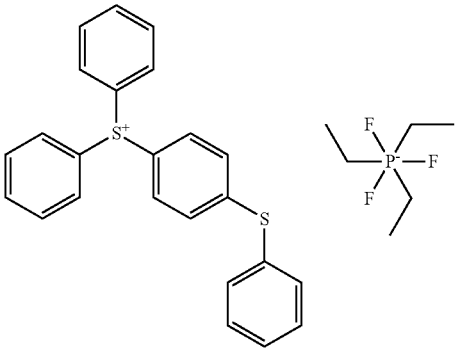

[Formula 31]

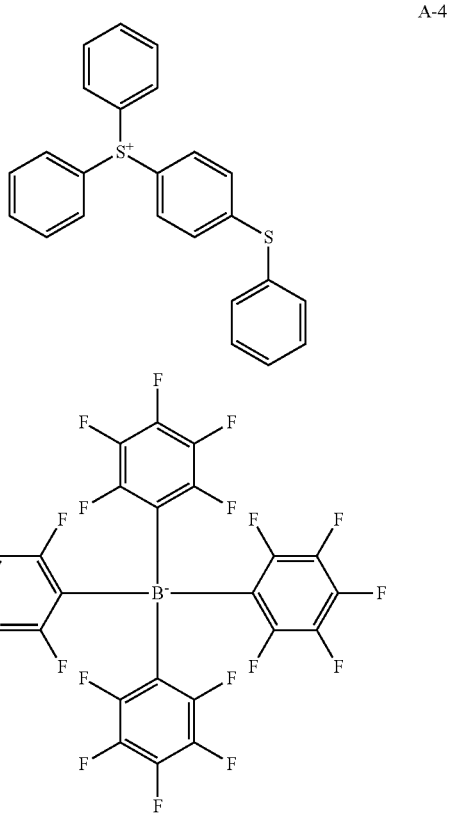

In examples and comparative examples, B-1 described below was used as an aromatic vinyl ether compound.

[Formula 32]

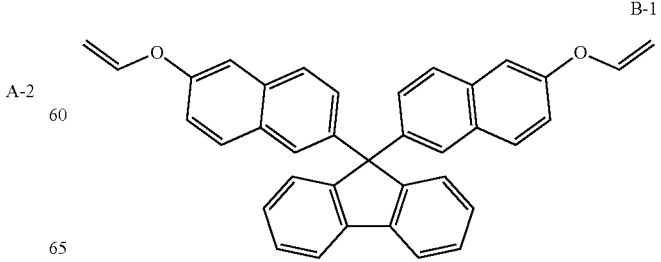

5 parts by mass of the cationic polymerization initiator specified in Table 1 and 100 parts by mass of an aromatic vinyl ether compound were uniformly dissolved in propylene glycol monomethyl ether acetate (PGMEA) so that the solid content became 20 mass %. Thus, a curable composition of each of the examples and the comparative examples was obtained. The resulting curable composition was used in curability evaluation conducted by the following method. The results of evaluation are shown in Table 1.

Example 2

In the composition of Example 1, 60 parts by mass of a diepoxy compound shown below was further added to 100 parts by mass of the aromatic vinyl ether compound, then propylene glycol monomethyl ether acetate was further added thereto to adjust the solid content to 20 mass %, whereby a curable composition of Example 2 was obtained. The resulting composition was also subjected to curability evaluation conducted in the same manner as above. The results of evaluation are shown in Table 1.

[Formula 33]

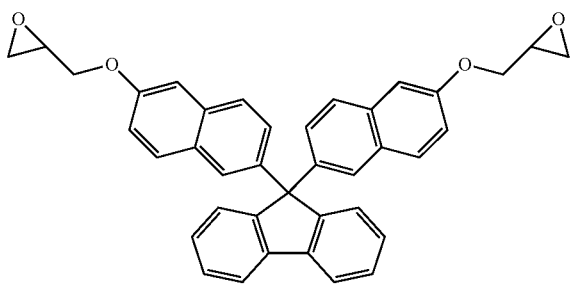

Example 3

In the composition of Example 1, 60 parts by mass of a diol compound shown below was further added to 100 parts by mass of the aromatic vinyl ether compound, and then propylene glycol monomethyl ether acetate was further added thereto to adjust the solid content to 20 mass %, whereby a curable composition of Example 3 was obtained. The resulting composition was also subjected to curability evaluation conducted in the same manner as above. The results of evaluation are shown in Table 1.

[Formula 34]

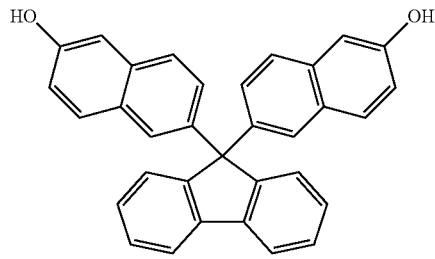

<Evaluation of Curability>

Chemical resistance (NMP resistance) of a cured film made of the curable composition was evaluated by the following method. Based on the evaluation results, curability of the curable composition was rated. First, the curable composition was applied to a substrate to form a coating film with a thickness of 1 µm. The resulting coating film was subjected to Prebake (100° C., 120 sec), light exposure (100 mJ/cm$^2$), and baking as Postbake (230° C., 20 min) in this order, and thus a cured film was obtained. The resulting cured film was immersed in N-methyl-2-pyrrolidone (NMP) at room temperature for 5 minutes and thus tested for chemical resistance. A cured film that had its thickness decreased or increased after NMP immersion to an extent within the range of 10% of its pre-NMP-immersion thickness was rated good; and a cured film that had this value greater than 10% was rated bad. The results of evaluation are shown in Table 1.

TABLE 1

| | Cationic polymerization initiator | Curability |
|---|---|---|
| Example 1 | A-1 | Good |
| Example 2 | A-1 | Good |
| Example 3 | A-1 | Good |
| Comparative Example 1 | A-2 | Bad |
| Comparative Example 2 | A-3 | Bad |
| Comparative Example 3 | A-4 | Bad |

As shown in Table 1, the aromatic vinyl ether compound B-1 favorably cures when used in combination with the cationic polymerization initiator A-1 having the structure of the formula (a1), but does not favorably cure when used in combination with any of the cationic polymerization initiators A-2 to A-4 not having the structure of the formula (a1).

What is claimed is:

1. A curable composition comprising a cationic polymerization initiator (A) and an aromatic vinyl ether compound (B),
    the aromatic vinyl ether compound (B) comprising an aromatic group substituted with a vinyloxy group,
    the cationic polymerization initiator (A) comprising a sulfonium salt represented by the following formula (a1):

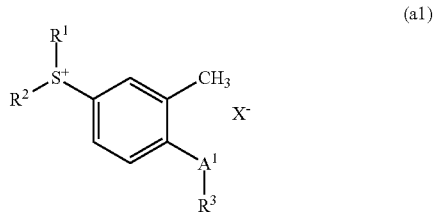

(a1)

wherein $R^1$ and $R^2$ independently represent a group represented by the following formula (a2); $R^1$ and $R^2$ may be bonded to each other to form a ring together with the sulfur atom in the formula; $R^3$ represents a group represented by the following formula (a3) or a group represented by the following formula (a4); $A^1$ represents S, O, or Se; $X^-$ represents a monovalent anion; and wherein both of $R^1$ and $R^2$ do not represent an alkyl group optionally substituted with a halogen atom,

(a2)

wherein a ring $Z^1$ represents an aromatic hydrocarbon ring; $R^4$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic hydrocarbon group, an alkylsulfinyl group, an alkylsulfonyl group, a hydroxy(poly)alkyleneoxy group, an optionally substituted amino group, a cyano group, a nitro group, or a halogen atom; and m1 represents an integer of 0 or more,

(a3)

wherein $R^5$ represents an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a5); $R^6$ represents an alkyl group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a6); $A^2$ represents a single bond, S, O, a sulfinyl group, or a carbonyl group; and n1 represents 0 or 1,

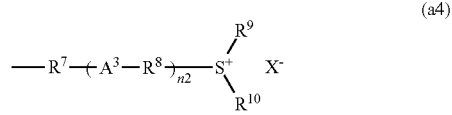
(a4)

wherein $R^7$ and $R^8$ independently represent an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom or a group represented by the following formula (a5); $R^9$ and $R^{10}$ independently represent an alkyl group optionally substituted with a halogen atom or a group represented by the formula (a2); $R^9$ and $R^{10}$ may be bonded to each other to form a ring together with the sulfur atom in the formula; $A^3$ represents a single bond, S, O, a sulfinyl group, or a carbonyl group; $X^-$ is the same as defined above; n2 represents 0 or 1; and not both of $R^9$ and $R^{10}$ are an alkyl group optionally substituted with a halogen atom)

(a5)

wherein a ring $Z^2$ represents an aromatic hydrocarbon ring; $R^{11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom; and m2 represents an integer of 0 or more,

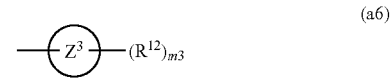
(a6)

wherein a ring $Z^3$ represents an aromatic hydrocarbon ring; $R^{12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, a selenophenylcarbonyl group, an aryl group, a heterocyclic hydrocarbon group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom; and m3 represents an integer of 0 or more).

2. The curable composition according to claim 1, wherein the aromatic vinyl ether compound (B) is a compound represented by the following formula (1):

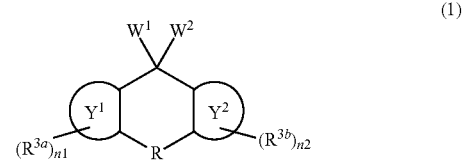
(1)

wherein $W^1$ and $W^2$ independently represent a group represented by the following formula (2), a group represented by the following formula (3), or a hydroxy group; at least one of $W^1$ and $W^2$ is a group represented by the following formula (2); a ring $Y^1$ and a ring $Y^2$ represent the same aromatic hydrocarbon ring or different aromatic hydrocarbon rings; R represents a single bond, a methylene group optionally having a substituent, an ethylene group optionally having a substituent and optionally having a heteroatom between the two carbon atoms, a group represented by —O—, a group represented by —NH—, or a group represented by —S—; $R^{3a}$ and $R^{3b}$ independently represent a cyano group, a halogen atom, or a monovalent hydrocarbon group; and n1 and n2 independently represent an integer of 0 or more and 4 or less,

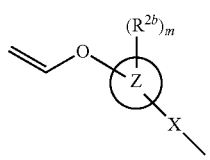
(2)

wherein a ring Z represents an aromatic hydrocarbon ring; X represents a single bond or a group represented by —S—; $R^{2b}$ represents a monovalent hydrocarbon group, a hydroxy group, a group represented by —$OR^{3a}$, a group represented by —$SR^{3b}$, an acyl group, an alkoxycarbonyl group, a halogen atom, a nitro group, a cyano group, a mercapto group, a carboxyl group, an amino group, a carbamoyl group, a group represented by —$NHR^{3c}$, a group represented by —$N(R^{3d})_2$, a (meth)acryloyloxy group, a sulfo group, or a group formed by substituting at least a part of hydrogen atoms bonded to carbon atoms comprised in a monovalent hydrocarbon group, a group represented by —$OR^{3a}$, a group represented by —$SR^{3b}$, an acyl group, an alkoxycarbonyl group, a group represented by —$NHR^{3c}$, or a group represented by —$N(R^{3d})_2$ with a monovalent hydrocarbon group, a hydroxy group, a group represented by —$OR^{3a}$, a group represented by —$SR^{3b}$, an acyl group, an alkoxycarbonyl group, a halogen atom, a nitro group, a cyano group, a mercapto group, a carboxyl group, an amino group, a carbamoyl group, a group represented by —$NHR^{3c}$, a group represented by —$N(R^{3d})_2$, a (meth)acryloyloxy group, a mesyloxy group, or a sulfo group; $R^{3a}$ to $R^{3d}$ independently represent a monovalent hydrocarbon group; and m represents an integer of 0 or more,

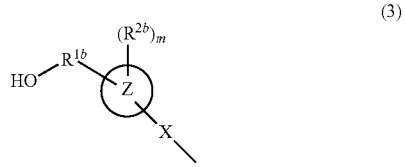
(3)

wherein $R^{1b}$ represents a single bond or an alkylene group having 1 or more and 4 or less carbon atoms; and each of ring Z, X, $R^{2b}$, and m is the same as defined above in formula (2).

3. The curable composition according to claim 2, wherein each of $W^1$ and $W^2$ is a group represented by the formula (2) and the ring Z is a naphthalene ring.

4. The curable composition according to claim 1, wherein the aromatic vinyl ether compound (B) is a compound comprising a fluorene ring.

5. The curable composition according to claim 1, wherein each of $R^1$ and $R^2$ in the formula (a1) represents the group represented by the formula (a2) and
wherein the group is a phenyl group.

6. The curable composition according to claim 1, wherein $A^1$ in the formula (a1) is S.

7. The curable composition according to claim 1, wherein $X^-$ in the formula (a1) is an anion selected from the group consisting of $SbF_6^-$, $PF_6^-$, $(CF_3CF_2)_3PF_3^-$, $(C_6F_5)_4B^-$, $((CF_3)_2C_6H_3)_4B^-$, $(C_6F_5)_4Ga^-$, $((CF_3)_2C_6H_3)_4Ga^-$, and $(CF_3SO_2)_3C^-$.

8. The curable composition according to claim 1, wherein the cationic polymerization initiator (A) is comprised in a content of 0.01 parts by mass or more and 30 parts by mass or less in relation to 100 parts by mass of the aromatic vinyl ether compound (B).

9. A cured product formed by curing the curable composition according to claim 1.

10. A method of producing a cured product, the method comprising:
shaping the curable composition according to claim 1 into a predetermined shape; and
subjecting the shaped curable composition to at least one of light exposure and heating.

11. The method of producing a cured product according to claim 10, wherein the shaping of the curable composition is formation of a coating film, and the coating film is subjected to at least one of light exposure and heating.

12. The method of producing a cured product according to claim 10, wherein the shaped curable composition is subjected to light exposure and heating.

* * * * *